US012715619B2

(12) United States Patent
Weiss et al.

(10) Patent No.: US 12,715,619 B2
(45) Date of Patent: Aug. 25, 2026

(54) SYSTEM AND METHOD SUITABLE FOR CONTROLLING OPERATIONS OF A SPACECRAFT BASED ON AN ISOPERIMETRIC REFORMULATION OF CONSTRAINTS

(71) Applicant: Mitsubishi Electric Research Laboratories, Inc., Cambridge, MA (US)

(72) Inventors: Avishai Weiss, Boston, MA (US); Abraham Vinod, Cambridge, MA (US); Purnanand Elango, Seattle, WA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 73 days.

(21) Appl. No.: 18/794,759

(22) Filed: Aug. 5, 2024

(65) Prior Publication Data

US 2026/0035105 A1 Feb. 5, 2026

(51) Int. Cl.

*G06F 17/00* (2019.01)
*B60W 50/00* (2006.01)
*B63B 79/40* (2020.01)
*B64G 1/10* (2006.01)
*B64G 1/24* (2006.01)

(52) U.S. Cl.

CPC ............. *B64G 1/244* (2019.05); *B60W 50/00* (2013.01); *B63B 79/40* (2020.01); *B64G 1/1071* (2023.08)

(58) Field of Classification Search

CPC ..... B64G 1/244; B64G 1/1071; B60W 50/00; B63B 79/40
USPC .............................................................. 701/3
See application file for complete search history.

(56) References Cited

U.S. PATENT DOCUMENTS 10,139,809 B2 * 11/2018 Sayyarrodsari ...... G05B 13/048
11,807,404 B2 11/2023 Weiss et al.
11,834,203 B2 12/2023 Weiss et al.
2021/0403182 A1 12/2021 Weiss et al.
2022/0063842 A1 * 3/2022 Weiss ..................... B64G 1/368
2022/0227503 A1 * 7/2022 Barnhart ................ G06N 3/126

OTHER PUBLICATIONS

Hartil et al., A Survey of the Maximum Principles for Optimal Control Problems With State Constraints*, 1995, SIAM Review, vol. 37, No. 2, pp. 181-218 (Year: 1995).*

(Continued)

*Primary Examiner* — Jelani A Smith
*Assistant Examiner* — George A Alcorn, III
(74) *Attorney, Agent, or Firm* — Gene Vinokur

(57) ABSTRACT

The present disclosure provides a controller and a method for controlling an operation of a vehicle subject to constraints based on continuously parametrized sets (CPS). The controller comprises at least one processor and a non-transitory memory having instructions stored thereon that, when executed by the at least one processor, cause the controller to determine a trajectory for the vehicle using an isoperimetric reformulation of the constraints based on the CPS. The trajectory is iteratively updated with successive approximations of the CPS using linearized dynamics of the vehicle corresponding to a current trajectory iterate. The controller further controls the vehicle according to the trajectory.

18 Claims, 17 Drawing Sheets

(56) References Cited

OTHER PUBLICATIONS

McGill, Optimal Control, Inequality State Constraints, and the Generalized Newton-Raphson Algorithm*, 1965, Ser. A, vol. 3, No. 2, pp. 291-298 (Year: 1965).*
Lee et al., Optimal Landing of a Helicopter in Autorotation, 1988, AIAA, J. Guidance, vol. 11, No. 1, pp. 7-12 (Year: 1988).*
Fontes, Fernando A. C. C., and Luis Tiago Paiva. "Guaranteed Constraint Satisfaction in Continuous-Time Control Problems." IEEE Control Systems Letters, vol. 3, No. 1, 2019, pp. 13-18.
R. McGill, "Optimum control, inequality state constraints, and the generalized newton-raphson algorithm," J. Soc. Ind. Appl. Math., vol. 3, No. 2, pp. 291-298, Jan. 1965.
K. Teo and C. Goh, "A simple computational procedure for optimization problems with functional inequality constraints," IEEE Trans. Automat. Contr., vol. 32, No. 10, pp. 940-941, Oct. 1987.

* cited by examiner

SYSTEM AND METHOD SUITABLE FOR CONTROLLING OPERATIONS OF A SPACECRAFT BASED ON AN ISOPERIMETRIC REFORMULATION OF CONSTRAINTS

TECHNICAL FIELD

The present disclosure relates generally to control systems suitable for controlling operation of a vehicle suitable for controlling an operation of a spacecraft subject to constraints based on continuously parametrized sets (CPS).

BACKGROUND

Vehicles are configured to perform various operations. For instance, the vehicle (such as a spacecraft) is configured to rendezvous with a target. The target may be a spacecraft, a celestial body, an international space station, or orbital debris. Rendezvous involves a precise match of orbital velocities and position vectors of the vehicle and the target, allowing them to remain at a constant distance. Such a vehicle rendezvous may or may not be followed by docking or berthing, procedures which bring the spacecraft into a physical contact and create a link between them. Further, the same vehicle rendezvous may be used for spacecraft “landing” on natural objects if there is a weak gravitational field, e.g., landing on an asteroid or on one of Martian moons.

However, the vehicle rendezvous with the target is a challenging task. A critical criterion for the vehicle rendezvous is maintenance of passive safety, that is, an ability to avoid a collision between the vehicle and the target, in case of a partial or full thrust control failure of the vehicle. In the case of thrust control failure, the vehicle may deviate from its nominal approach in proximity to the target. When the vehicle deviates significantly from its nominal approach in proximity to the target and its current trajectory is not passively safe, the vehicle may collide with the target.

To this end, a trajectory which ensures passive safety is to be determined for the vehicle. The trajectory can be determined by formulating and solving an optimal control problem in which passive safety is enforced as a constraint. There are two families of methods for solving the optimal control problem: direct methods and indirect methods. The direct methods are widely used because of their flexibility in handling a variety of constraints and vehicle dynamics. However, both families of methods require a time-discretization step and yield a solution on a discrete-time grid that approximates a true continuous-time solution. Because of time-discretization, violation of the constraints between sample points is ignored, which is crucial for safety-critical applications.

Therefore, there is a need for system and method for solving the optimal control problem while ensuring continuous-time satisfaction of the constraints.

SUMMARY

It is an object of some embodiments to provide a system and a method for determining a trajectory for a vehicle that ensures passive and/or active safety of the vehicle. It is also an object of some embodiments to determine such a trajectory as a solution to an optimal control problem while ensuring continuous time constraint satisfaction. Additionally, it is an object of some embodiments to control the vehicle according to the trajectory.

In one embodiment, the vehicle’s operation is to rendezvous with a target. The vehicle may be a spacecraft or any type of wheeled vehicle, such as a passenger car or a bus. Further, the vehicle may be an autonomous vehicle or a semi-autonomous vehicle. For the purpose of clarity of explanation, the vehicle is considered to be a spacecraft. The target may be a spacecraft, a celestial body, an international space station, orbital debris, or a planetary body, for e.g., for precision rocket landing. Rendezvous involves a precise match of orbital velocities and position vectors of the vehicle and the target, allowing them to remain at a constant distance. However, performing rendezvous to the target safely presents several challenges for the vehicle. For instance, one criterion for the rendezvous is the maintenance of passive safety, that is, an ability to avoid a collision between the vehicle and the target in case of full thrust control failure of the vehicle. Another criterion for the rendezvous is the maintenance of active safety, that is, an ability to avoid a collision between the vehicle and target in case of partial thrust control failure of the vehicle.

Some embodiments are based on recognition that passively safe spacecraft rendezvous is achieved for the vehicle by approaching the target in a manner that avoids unsafe regions of state space. The unsafe regions of state space can be defined using reachability theory and may be referred to as a backward reachable set (BRS) or, more generally, as a robust controllability set (RCS). The RCS comprises vehicle states that naturally drift (without the use of vehicle thruster control) into a region around the target. Natural drift in space results when all thrusters of the vehicle are fully off, such that forces acting on the vehicle results in natural orbital motion, i.e. natural drift that places the vehicle in motion. Natural orbital forces and perturbations are nonlinear and may include earth gravity, solar and lunar gravitational perturbations, anisotropic gravitational perturbations due to a central body’s non-sphericity, solar radiation pressure, air drag, and the like.

The RCS may vary at multiple instances across a trajectory horizon (t) and safety horizon ($\tau$). The variation of the RCS defines a keep-away zone for the vehicle to avoid in case of full thrust control failure of the vehicle, to ensure passive safety.

To this end, it is an object of some embodiments to determine a trajectory for the vehicle that avoids the keep-away zone to ensure passive safety, such that in the event of full thrust control failure of the vehicle, the vehicle is outside the keep-away zone and does not drift towards the target, thereby avoiding collision. Such an objective can be achieved by formulating an optimal control problem in which the RCS is enforced as a constraint (referred as RCS-based constraints). For example, an optimal control problem is formulated with a constraint that a distance between the vehicle and the RCS is greater than zero, such that at no instance in time, the vehicle enters the RCS and thus, in the event of thrust control failure, the collision with the target is avoided. Therefore, the solution of such an optimal control problem is a trajectory that ensures passive safety.

However, since passive safety is required in continuous time, that is, for all time and not just on a discrete time grid, and the forces acting on the vehicle are nonlinear, the RCS are computationally intractable and thus the solution to the optimal control problem cannot be computed.

Therefore, there is a need to solve the optimal control problem that involves the RCS while ensuring continuous-time constraint satisfaction.

Some embodiments are based on realization that, to ensure continuous-time constraint satisfaction, RCS-based constraints can be reformulated as a boundary value problem using an isoperimetric reformulation. In particular, using the isoperimetric reformulation, infinitely many pointwise-in-time constraints on nonlinear scalar valued metrics of RCS can be expressed as a single integral equality constraint, which then can be equivalently expressed as the boundary value problem, i.e. an ordinary differential equation with boundary constraints.

In an embodiment, the boundary value problem is formed by augmenting a dynamical state of the vehicle with an auxiliary state. The auxiliary state is an integral of the isoperimetric reformulation of a constraint-based on a nonlinear scalar-valued metric of the RCS. In an embodiment, the nonlinear scalar-valued metric of the RCS is a signed distance of a state of the vehicle to the RCS, where the signed distance is an orthogonal distance of a given point to the boundary of the RCS in a metric space, with the sign determined by whether the point is inside the RCS.

The auxiliary state measures cumulative continuous-time constraint violation. By setting boundary conditions on the auxiliary state such that the auxiliary state value at an initial time and a final time of a time interval are equal, the RCS-based constraints are ensured to be satisfied for all times within the time interval.

Further, the boundary value problem is time-discretized and solved using sequential convex programming. Though a time discretization is performed to find numerical solutions to the optimal control problem, by constraining the auxiliary state to be constant at all temporal nodes in the discretization, all constraints, including the nonlinear scalar-valued metric of the RCS, are ensured to be satisfied at all times. Since the auxiliary state encodes a constraint based on the nonlinear scalar-valued metric of the RCS, the RCS is successively approximated using linearized dynamics of the vehicle at each iteration of sequential convex programming. At convergence of the sequential convex programming, the trajectory computed for the linearized dynamics of the vehicle also satisfies original nonlinear dynamics of the vehicle. As a result, the trajectory satisfies RCS-based constraints for the nonlinear dynamics of the vehicle. In addition, the approximated RCS at each iteration of the sequential convex programming can be inflated using Lagrange remainder to satisfy the RCS-based constraints within a tube around the computed trajectory.

In such a way, the sequential convex programming and the isoperimetric reformulation are leveraged to control fidelity to which the RCS can be encoded in the optimal control problem without varying the complexity/size of the optimal control problem.

Accordingly, one embodiment discloses a controller for controlling an operation of a vehicle subject to constraints based on continuously parametrized sets (CPS). The controller comprises at least one processor and a non-transitory memory having instructions stored thereon that, when executed by the at least one processor, cause the controller to determine a trajectory for the vehicle using an isoperimetric reformulation of the constraints based on the CPS. The trajectory is iteratively updated with successive approximations of the RCS using linearized dynamics of the vehicle corresponding to a current trajectory iterate. The controller further controls the vehicle according to the trajectory.

Accordingly, another embodiment discloses a method for controlling an operation of a vehicle subject to constraints based on continuously parametrized sets (CPS). The method comprises determining a trajectory for the vehicle using an isoperimetric reformulation of the constraints based on the CPS, wherein the trajectory is iteratively updated with successive approximations of the CPS using linearized dynamics of the vehicle corresponding to a current trajectory iterate. The method further comprises controlling the vehicle according to the trajectory.

Accordingly, yet another embodiment discloses a non-transitory computer-readable storage medium embodied thereon a program executable by a processor for performing a method for controlling an operation of a vehicle subject to constraints based on continuously parametrized sets (CPS). The method comprises determining a trajectory for the vehicle using an isoperimetric reformulation of the constraints based on the CPS, wherein the trajectory is iteratively updated with successive approximations of the CPS using linearized dynamics of the vehicle corresponding to a current trajectory iterate. The method further comprises controlling the vehicle according to the trajectory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1A:
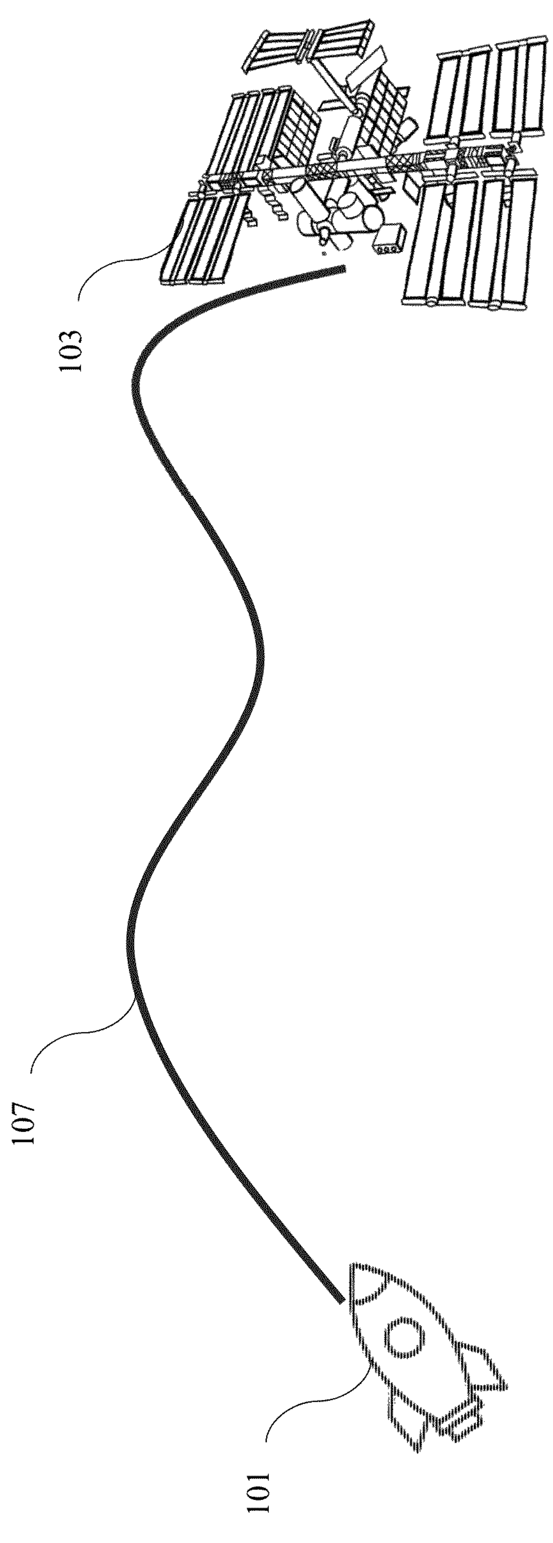
FIG. 1A illustrates an operation of a vehicle, according to an embodiment of the present disclosure.
Figure 1A:

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Embodiments of the present disclosure provide a system and a method for determining a trajectory for a vehicle which ensures continuous-time satisfaction of constraints based on continuously parametrized sets (CPS). According to some embodiments, such a trajectory is determined by solving an optimal control problem that involves constraints based on nonlinear scalar valued metrics of CPS. An example of the scalar valued metric includes a signed distance of a state of the vehicle to the CPS. In case of an optimal control problem that computes a trajectory for spacecraft rendezvous while ensuring passive safety, the CPS is a set of states from which a chaser spacecraft naturally drifts into a region around a target spacecraft, which poses collision risks between the chaser spacecraft and target spacecraft.

Some embodiments are provided for fail safety of the vehicle. For fail safety of the vehicle, robust controllable sets (RCS) classify state space as safe and unsafe and are continuously parameterized by time instants on a trajectory horizon and a safety horizon. The RCS are thus examples of CPS. For instance, the vehicle may be a spacecraft and embodiments of the present disclosure ensure continuous-time passive or active safety for a spacecraft rendezvous with a target, where the CPS are RCS that are continuously parametrized by propagation time for the trajectory horizon and the safety horizon. The RCS can be encoded, e.g., as ellipsoids, polytopes, or zonotopes, representing regions of state space that must be avoided. Example RCS include a backwards reachable set, which is a set of states which naturally drift (without use of spacecraft thruster control) into a final set, a robust backwards reachable set, which is a set of states for which no matter applied spacecraft controls evolve into a final set, a controllable set, which is a set of states for which there exists a disturbance force that drives states of the spacecraft into a final set, and finally a RCS, which is the most general set, and is a set of states that no matter the applied spacecraft controls, there exists a disturbance force that drives the states into the final set.

In this example of spacecraft rendezvous, the optimal control problem is formulated with a constraint that a distance between the spacecraft and the RCS is greater than zero, such that at no instance in time will the spacecraft rendezvous trajectory enter the RCS. By enforcing the spacecraft to be outside of the RCS, the passive safety or active-safety for the spacecraft is ensured, such that in an event of partial or full thrust control failure of the spacecraft, the spacecraft is outside the avoidance region and does not drift towards the target, thereby avoiding collision.

These and several other advantages will be evident from the following detailed description of example embodiments of the present disclosure. While some example embodiments are described with reference to a spacecraft rendezvous problem, it may be contemplated that control strategies of the present disclosure are applicable to any vehicle, whether a planetary lander, air, or ground vehicle. As such, example embodiments described herein are not to be limited to the spacecraft which is referred to only for exemplary purposes. The scope of the control strategies of the present disclosure encompasses situations and systems pertaining to any vehicle.

FIG. 1A illustrates an operation of a vehicle 101, according to an embodiment of the present disclosure. The vehicle 101 may be a spacecraft or any type of wheeled vehicle, such as a passenger car and a bus. Further, the vehicle 101 may be an autonomous vehicle or a semi-autonomous vehicle. For the purpose of explanation, the vehicle 101 is considered to be a spacecraft.

In an embodiment, the operation of the vehicle 101 is to rendezvous with a target 103 by following a trajectory 107. The target 103 may be a spacecraft, a celestial body, an international space station, or orbital debris. For the purpose of explanation, the target is 103 is illustrated as the international space station. Rendezvous involves a precise match of orbital velocities and position vectors of the vehicle 101 and the target 103, allowing them to remain at a constant distance. However, performing rendezvous to the target 103 safely presents several challenges for the vehicle 101. For instance, a critical criteria for the rendezvous is maintenance of passive safety, that is, an ability to avoid a collision between the vehicle 101 and the target 103 in case of full thrust control failure of the vehicle 101. Another criterion for the rendezvous is maintenance of active safety, that is, an ability to avoid a collision between the vehicle 101 and the target 103 in case of partial thrust control failure of the vehicle 101.

Some embodiments are based on recognition that passively/actively safe spacecraft rendezvous is achieved for the vehicle 101 by approaching the target 103 in a manner that avoids unsafe regions of state space.

Figure 1B:
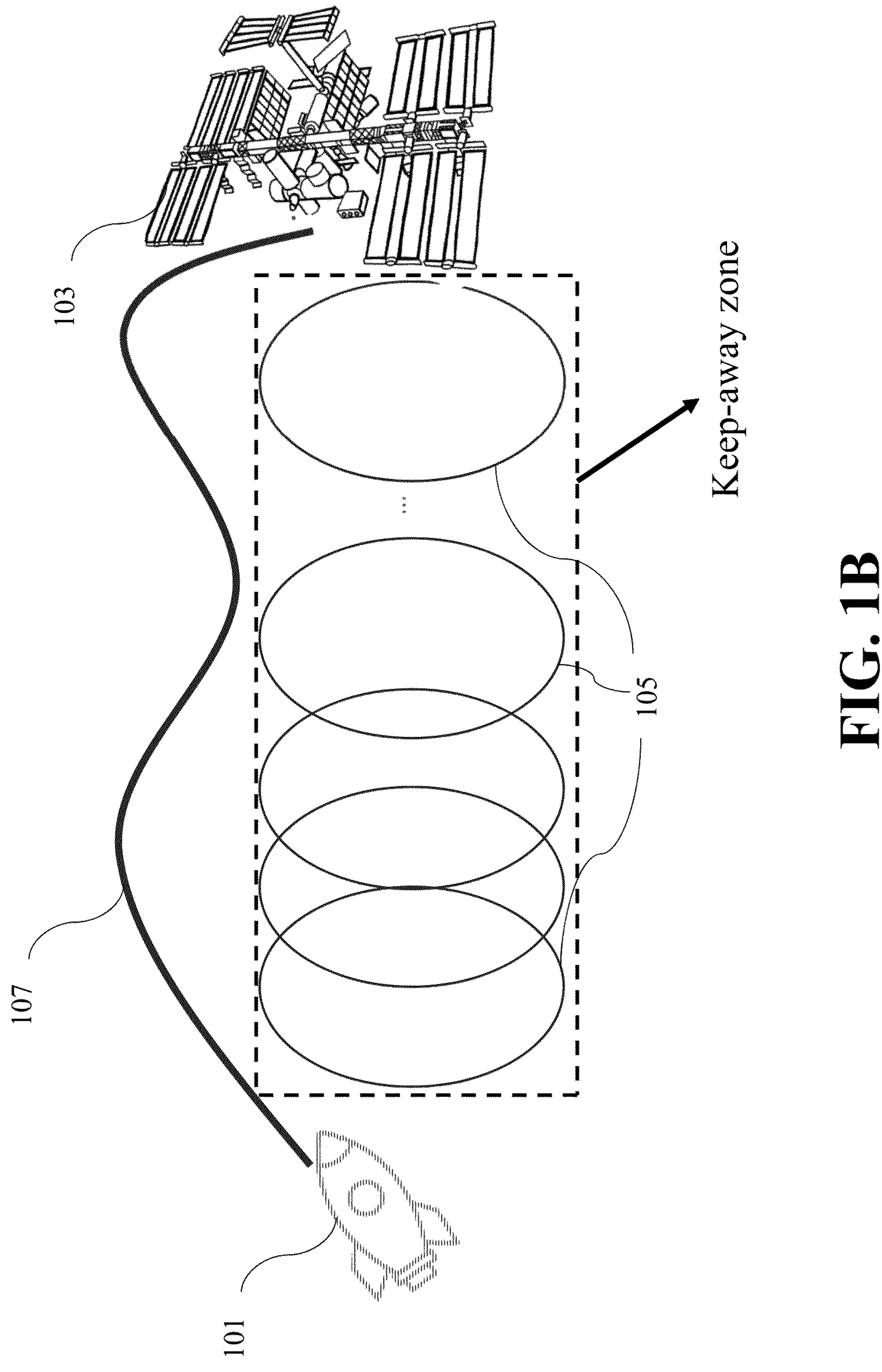
FIG. 1B illustrates a keep-away zone of the vehicle, according to some embodiments of the present disclosure.

FIG. 1B illustrates unsafe regions 105 of state space, according to some embodiments of the present disclosure. In an embodiment, the unsafe regions 105 of the state space collectively define a keep-away zone for the vehicle 101 to avoid in case of a partial or full thrust control failure of the vehicle 101, to ensure passive safety. The unsafe regions 105 of state space can be defined using reachability theory and may be referred to as a backwards reachable set (BRS) or, more generally, as a robust controllability sets (RCS) 105.

The RCS 105 comprise vehicle states that naturally drift (without use of vehicle thruster control) into a region around the target 103. Natural drift in space results when all thrusters of the vehicle 101 are off, such that forces acting on the vehicle 101 results in natural orbital motion, i.e. natural drift that places the vehicle 101 in motion. Natural orbital forces and perturbations are nonlinear and may include earth gravity, solar and lunar gravitational perturbations, anisotropic gravitational perturbations due to a central body's non-sphericity, solar radiation pressure, air drag, and the like.

Figure 1C:
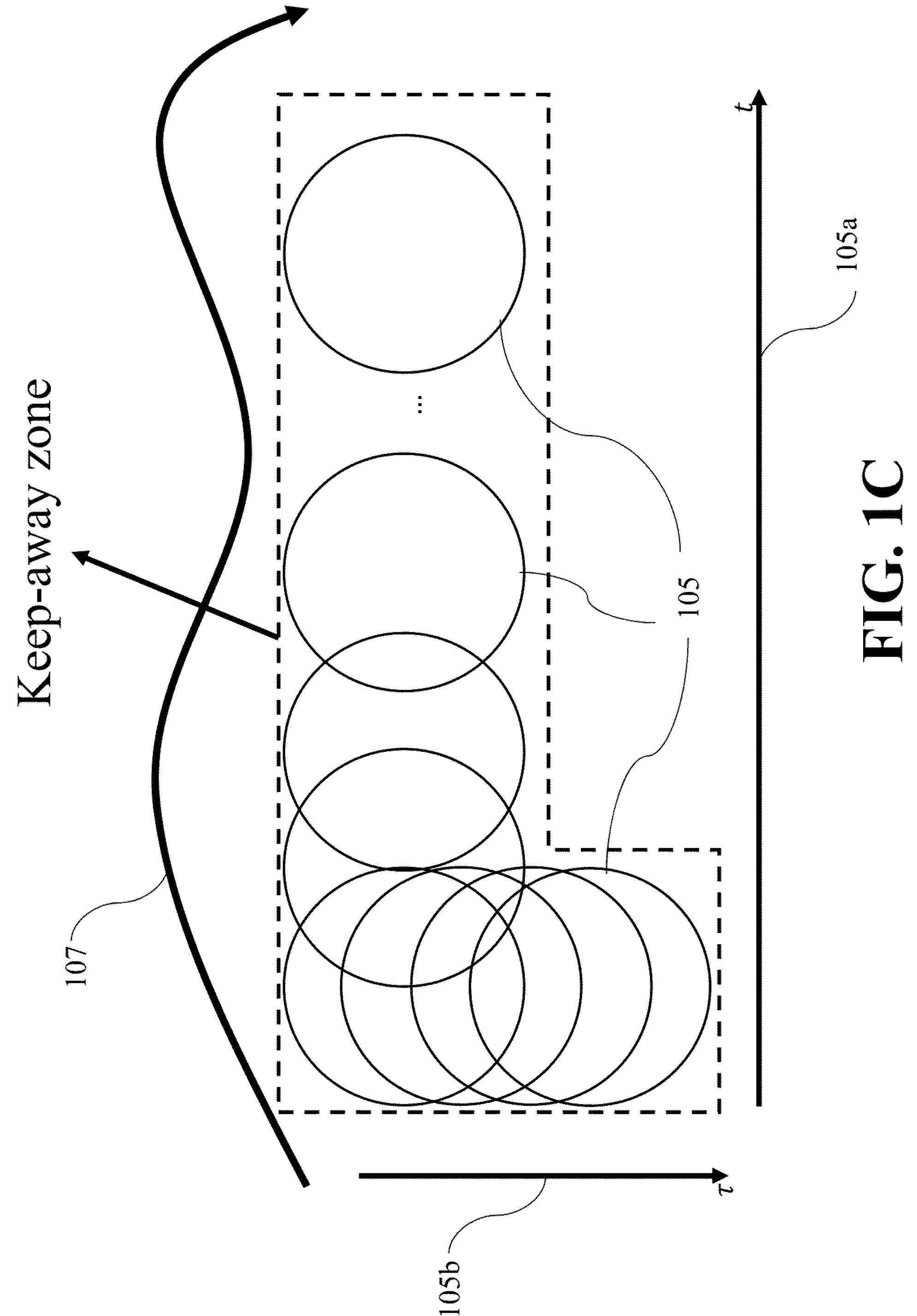
FIG. 1C illustrates varying robust controllability sets (RCS), according to some embodiments.

FIG. 1C illustrates varying RCS 105, according to some embodiments. The RCS 105 may vary at multiple instances across trajectory horizon (t) 105*a* and safety horizon (τ) 105*b*. In some embodiments, the variation of the RCS 105 defines a keep-away zone for the vehicle 101 to avoid in case of full thrust control failure of the vehicle 101, to ensure passive safety.

To this end, it is an object of some embodiments to determine the trajectory 107 for the vehicle 101 that avoids the keep-away zone to ensure passive safety, such that in the event of full thrust control failure of the vehicle 101, the vehicle 101 is outside the keep-away zone and does not drift towards the target, thereby avoiding collision. Such an objective can be achieved by formulating an optimal control problem in which the RCS 105 is enforced as a constraint (referred to as RCS-based constraints). For example, an optimal control problem is formulated with a constraint that a distance between the vehicle 101 and the RCS 105 is greater than zero, such that at no instance in time the vehicle 101 enters the RCS 105 and thus, in the event of thrust control failure, the keep-away zone is avoided. Therefore, the solution of such an optimal control problem is a trajectory that ensures passive safety.

However, since passive safety is required in continuous time, that is, for all time and not just on a discrete time grid, and the forces acting on the vehicle 101 are nonlinear, the RCS 105 are computationally intractable and thus the solution to the optimal control problem cannot be computed.

Therefore, there is a need to solve the optimal control problem that involves the RCS 105 while ensuring continuous-time constraint satisfaction.

Figure 1D:
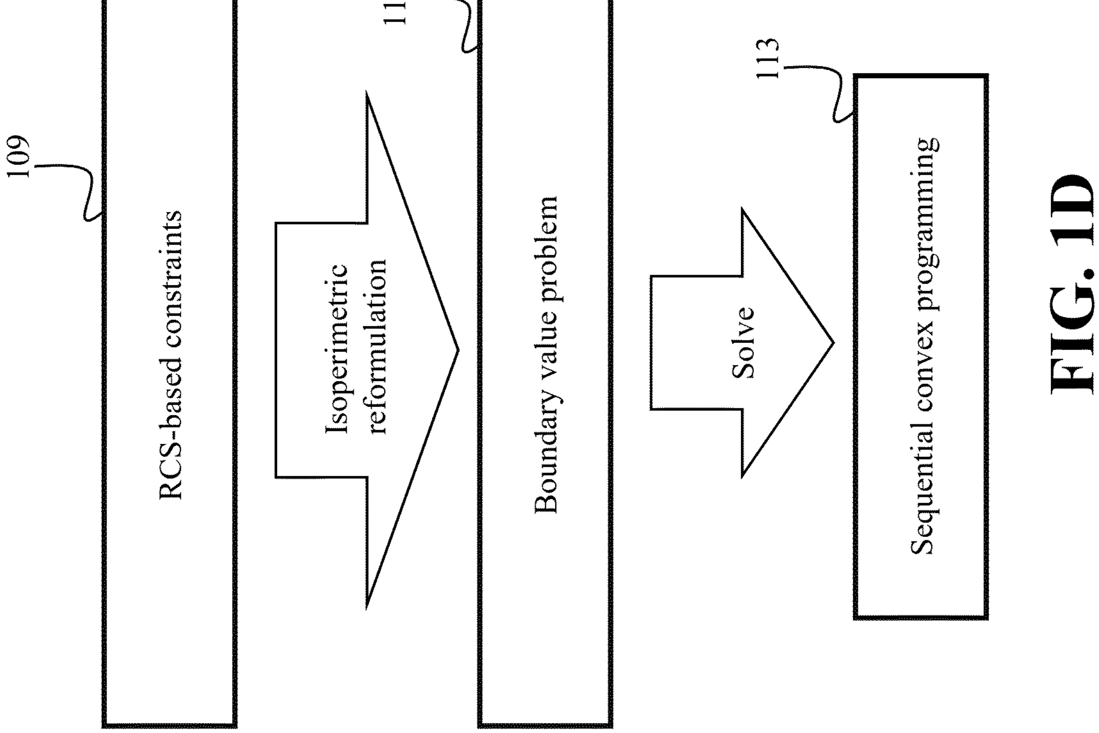
FIG. 1D illustrates principles used by some embodiments of the present disclosure.

Referring to FIG. 1D, some embodiments are based on realization that, to ensure continuous-time constraint satisfaction, RCS-based constraints 109 can be reformulated as a boundary value problem 111 using an isoperimetric reformulation. In particular, using the isoperimetric reformulation, infinitely many pointwise-in-time constraints on nonlinear scalar valued metrics of RCS 105 can be expressed as a single integral equality constraint, which then can be equivalently expressed as the boundary value problem 111, i.e. an ordinary differential equation with boundary constraints.

In an embodiment, the boundary value problem 111 is formed by augmenting a dynamical state of the vehicle 101 with an auxiliary state. The dynamical state of the vehicle 101 may include one or combination of position, orientation, and translational and angular velocities of the vehicle 101. The auxiliary state is an integral of the isoperimetric reformulation of a constraint based on a nonlinear scalar valued metric of the RCS 105. In an embodiment, the nonlinear scalar valued metric of the RCS 105 is a signed distance of a state of the vehicle 101 to the RCS 105, where the signed distance is an orthogonal distance of a given point to boundary of the RCS 105 in a metric space, with the sign determined by whether the point is inside the RCS 105.

The auxiliary state measures the cumulative continuous-time constraint violation. By setting boundary conditions on the auxiliary state such that the auxiliary state value at an initial time and a final time of a time interval are equal, the RCS-based constraints 109 are ensured to be satisfied for all times within the time interval.

Further, the boundary value problem 111 is time-discretized and solved using sequential convex programming 113. Though a time discretization is performed to find numerical solutions to the optimal control problem, by constraining the auxiliary state to be constant at all temporal nodes in the discretization, all constraints, including the nonlinear scalar valued metric of the RCS 105, are ensured to be satisfied at all times. Since the auxiliary state encodes a constraint based on the nonlinear scalar valued metric of the RCS 105, the RCS 105 is successively approximated using linearized dynamics of the vehicle 101 at each iteration of the sequential convex programming 113. At convergence of the sequential convex programming 113, the trajectory computed for the linearized dynamics of the vehicle 101 also satisfies original nonlinear dynamics of the vehicle 101. As a result, the trajectory satisfies RCS-based constraints 105 for the nonlinear dynamics of the vehicle 101. In addition, the approximated RCS at each iteration of the sequential convex programming can be inflated using Lagrange remainder to satisfy the RCS-based constraints within a tube around the computed trajectory.

In such a way, the sequential convex programming and the isoperimetric reformulation are leveraged to control fidelity to which the RCS 105 can be encoded in the optimal control problem without varying complexity/size of the optimal control problem.

Figure 1E:
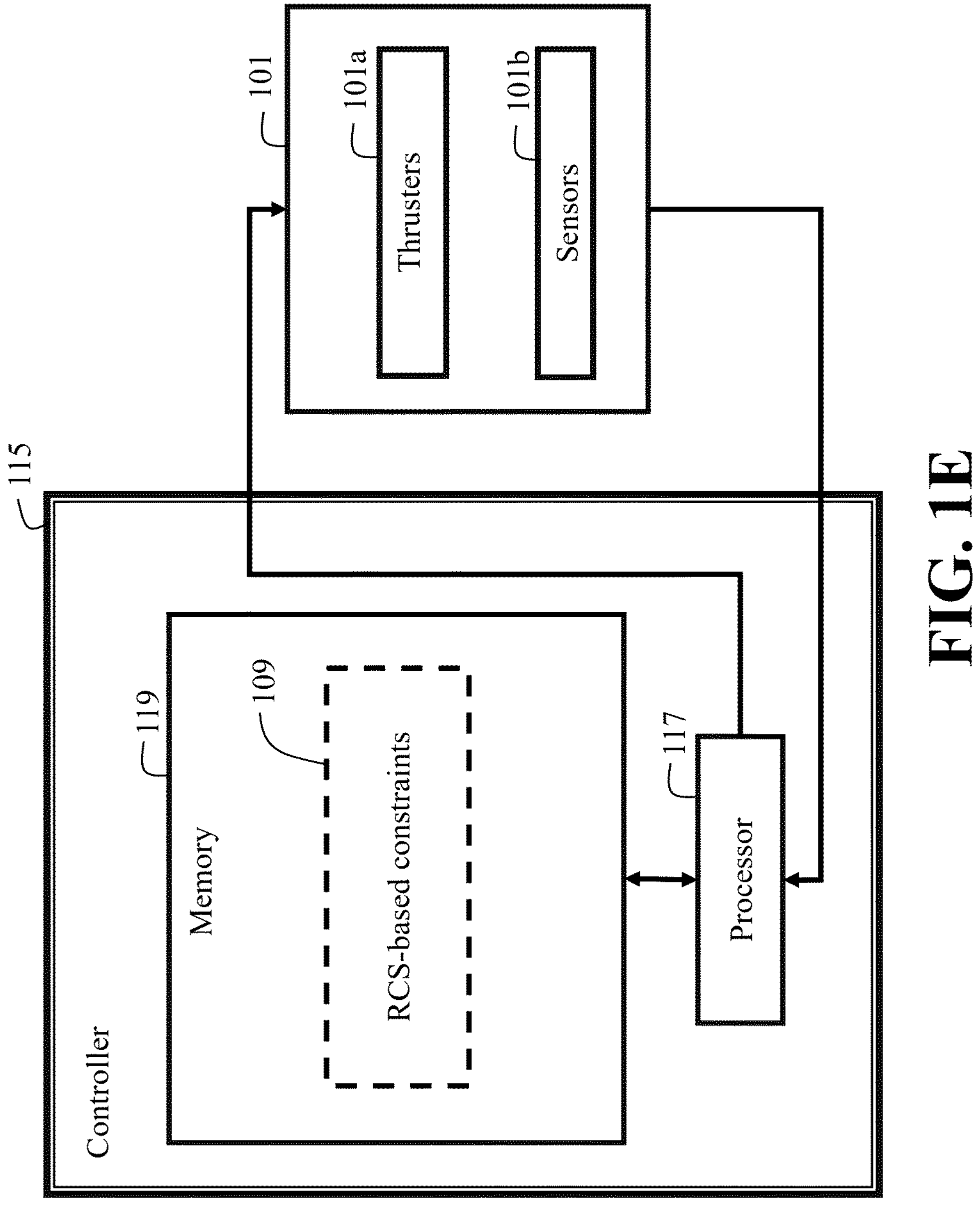
FIG. 1E illustrates a controller that uses the principles described in FIG. 1D for controlling the operation of the vehicle, according to an embodiment of the present disclosure.

FIG. 1E illustrates a controller 115 that uses the principles described in FIG. 1C for controlling the operation of the vehicle 101, according to an embodiment of the present disclosure. The controller 115 includes a processor 117 and a memory 119. The processor 117 may be a single core processor, a multi-core processor, a computing cluster, or any number of other configurations. The memory 119 may include random access memory (RAM), read only memory (ROM), flash memory, or any other suitable memory systems. Additionally, in some embodiments, the memory 119 may be implemented using a hard drive, an optical drive, a thumb drive, an array of drives, or any combinations thereof.

The controller 115 is communicatively coupled to the vehicle 101. The vehicle 101 includes thrusters 101*a* and sensors 101*b*. The thrusters 101*a* are configured to produce forces that maintain the vehicle 101 along the trajectory 107. For instance, in an embodiment, the vehicle 101 may be equipped with eight thrusters that are mounted at corners of the vehicle 101 so that they align and produce forces that act on a center of mass of the vehicle 101 without producing any torques that would rotate the vehicle. The sensors 101*b* are configured to determine a state of the vehicle 101. The state of the vehicle 101 may include one or combination of position, orientation, and translational and angular velocities of the vehicle 101.

The controller 115 is configured to determine the trajectory 107 and control the vehicle 101 according to the trajectory 107, as explained below in FIG. 1F.

Figure 1F:
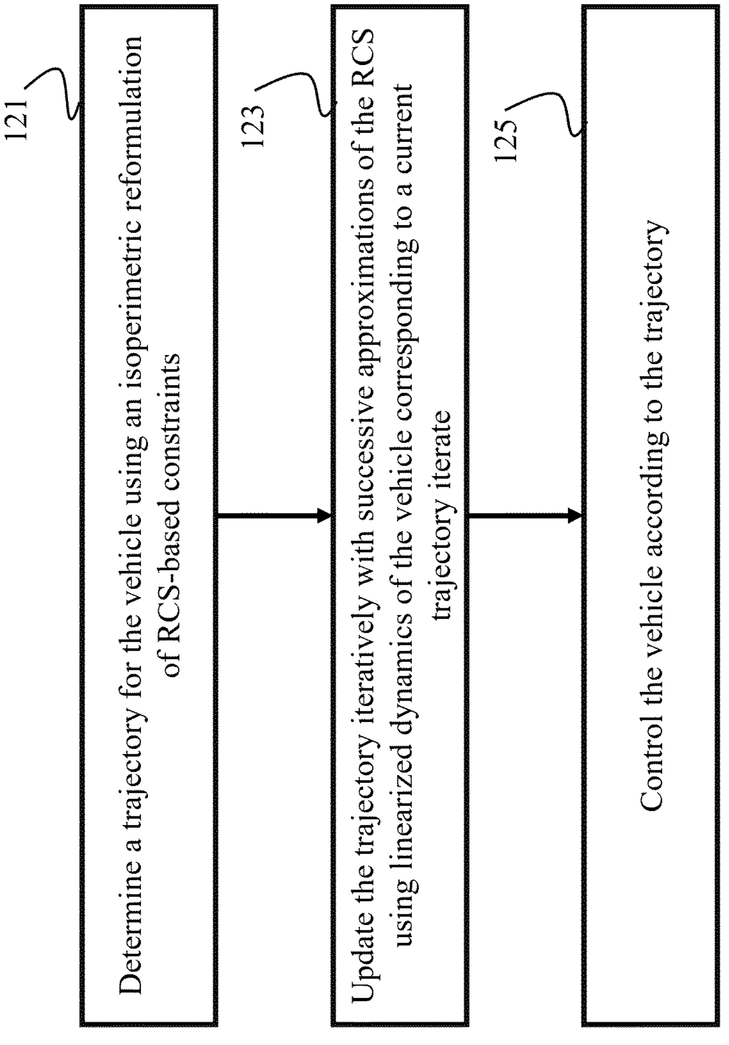
FIG. 1F shows a block diagram for determining a trajectory and controlling the vehicle according to the trajectory, according to an embodiment of the present disclosure.

FIG. 1F shows a block diagram for determining the trajectory 107 and controlling the vehicle 101 according to the trajectory 107, according to an embodiment of the present disclosure. At block 121, the controller 115 is configured to determine a trajectory for the vehicle 101 using the isoperimetric reformulation of the RCS-based constraints 109. The isoperimetric reformulation is described in detail in FIG. 2.

At block 123, the controller 115 is configured to update the trajectory iteratively with successive approximations of the RCS 105 using linearized dynamics of the vehicle 101 corresponding to a current trajectory iterate.

At block 125, the controller 115 is configured to control the vehicle 101 according to the trajectory 107. For instance, the processor 117 of the controller 115 generates control commands to thrusters 101*a* of the vehicle 101 based on the trajectory 107. The thrusters 101*a* produce forces according to the control commands. The produced forces maneuver the vehicle 101 according to the trajectory 107.

Figure 2:
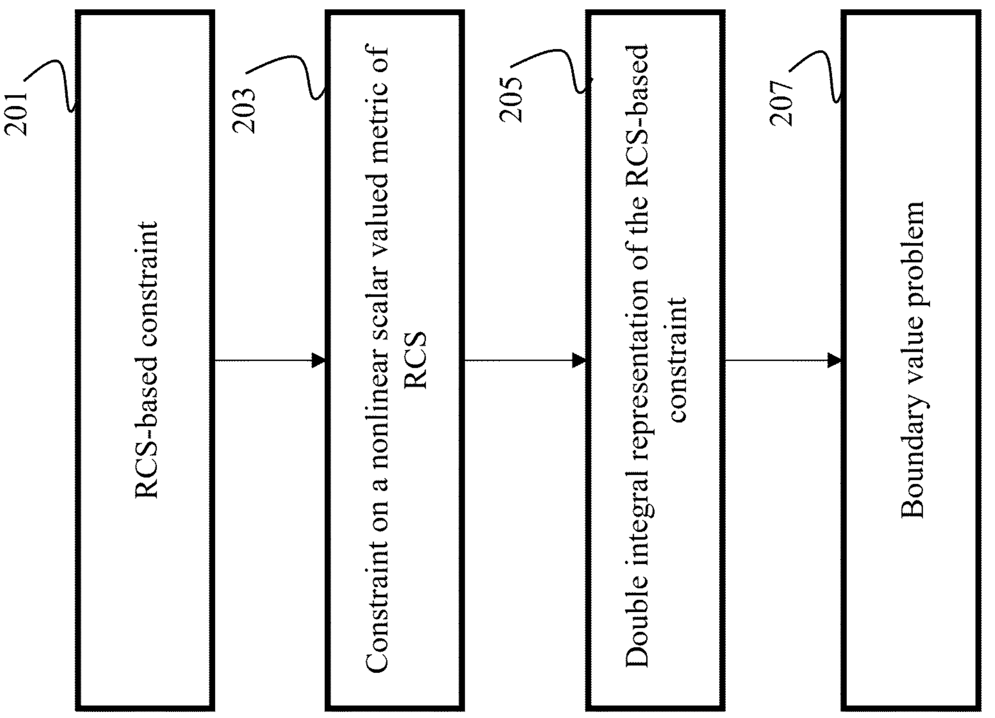
FIG. 2 shows a block diagram illustrating isoperimetric reformulation of RCS-based constraints, according to some embodiments of the present disclosure.

FIG. 2 shows a block diagram illustrating the isoperimetric reformulation of the RCS-based constraints, according to some embodiments of the present disclosure. The isoperimetric reformulation transforms the RCS-based constraint into the boundary value problem. Firstly, at step 201, the RCS-based constraint is formulated. Further, at step 203, a constraint on the nonlinear scalar valued metric of the RCS 105 is computed. The constraint on the nonlinear scalar valued metric of the RCS 105 is referred to as a metric based constraint.

Further, at step 205, the RCS-based constraint is presented as a double integral over the trajectory horizon 105*a* and the safety horizon 105*b* of a distance between the vehicle 101 and the keep-away zone. The double integral consists of composing a numerical integration of a dynamical system differential equation over the trajectory horizon 105*a* with an integration over the safety horizon 105*b*. Furthermore, the integration over the safety horizon 105*b* is composed with a quadratic programming (QP) solver for computing the distance between the vehicle 101 and the keep-away zone, in particular, the signed-distance with respect to the RCS, which is parameterized over a two-dimensional grid composed of the trajectory horizon 105*a* and the safety horizon 105*b* such that interpolation (table loop-up) is efficient. Such a nested composition of integrations, two-dimensional table-lookup, and the QP solver is efficient due to a (low-order) polytopic approximation of the original nonlinear system RCS via a linearized system.

Further, at step 207, the double integral is reformulated as a boundary value problem over the trajectory horizon 105*a*. The steps 201-207 are mathematically described below.

Let $0_n$ represent a vector of zeros in $\mathbb{R}^n$ and C([a, b], $\mathbb{R}^n$) represent a space of piecewise continuous functions that map [a, b] to $\mathbb{R}^n$. Consider a system $$\dot{x}(t) = f(t, x(t), u(t), w(t)),\quad t \in [t_i, t_f] \tag{1}$$

with state x(t)∈ $\mathbb{R}^{n_x}$, control input u(t)∈ $\mathbb{R}^{n_u}$, and process noise w(t)∈ $\mathbb{R}^{n_w}$.

It is an object of some embodiments to compute state trajectories (e.g. trajectory 107) over [$t_i$, $t_f$] which satisfy constraints of the form:

$$x(t) \notin \mathcal{E}(t, \tau),\quad \forall\, \tau \in [0, \tau_f],\ t \in [t_i, t_f] \tag{2}$$

where ε(t, τ) are parameterized compact sets. Given an avoid set $\mathcal{P} \subset \mathbb{R}^{n_x}$, and compact sets $\mathcal{U} \subset \mathbb{R}^{n_u}$ and $\mathcal{W} \subset \mathbb{R}^{n_w}$, the following are some examples of RCS-based constraints:

Backward reachable set (BRS):

$$\mathcal{E}(t, \tau) = \left\{ z \in \mathbb{R}^{n_x} \;\middle|\; \begin{array}{l} \frac{dx(\gamma)}{d\gamma} = f\big(\gamma, x(\gamma), 0_{n_u}, 0_{n_w}\big),\ \gamma \in [t, t+\tau] \\ x(t) = z,\ x(t+\tau) \in \mathcal{P} \end{array} \right\} \tag{3}$$

Robust BRS (with off-nominal actuation from $\mathcal{U}$):

$$\mathcal{E}(t, \tau) = \left\{ z \in \mathbb{R}^{n_x} \;\middle|\; \begin{array}{l} \forall\, u \in C([t, t+\tau], \mathcal{U}) \\ \frac{dx(\gamma)}{d\gamma} = f\big(\gamma, x(\gamma), u(\gamma), 0_{n_w}\big),\ \gamma \in [t, t+\tau] \\ x(t) = z,\ x(t+\tau) \in \mathcal{P} \end{array} \right\} \tag{4}$$

Controllable set (with process noise from $\mathcal{W}$):

$$\mathcal{E}(t, \tau) = \left\{ z \in \mathbb{R}^{n_x} \;\middle|\; \begin{array}{l} \exists\, w \in C([t, t+\tau], \mathcal{W}) \\ \frac{dx(\gamma)}{d\gamma} = f\big(\gamma, x(\gamma), 0_{n_u}, w(\gamma)\big),\ \gamma \in [t, t+\tau] \\ x(t) = z,\ x(t+\tau) \in \mathcal{P} \end{array} \right\} \tag{5}$$

Robust controllable sets (RCS) (with process noise from $\mathcal{W}$ and off-nominal actuation from $\mathcal{U}$):

$$\mathcal{E}(t, \tau) = \left\{ z \in \mathbb{R}^{n_x} \;\middle|\; \begin{array}{l} \exists\, w \in C([t, t+\tau], \mathcal{W}),\ \forall\, u \in C([t, t+\tau], \mathcal{U}) \\ \frac{dx(\gamma)}{d\gamma} = f\big(\gamma, x(\gamma), 0_{n_u}, w(\gamma)\big),\ \gamma \in [t, t+\tau] \\ x(t) = z,\ x(t+\tau) \in \mathcal{P} \end{array} \right\} \tag{6}$$

When the dynamics function $f$ is affine, the control input u and process noise w are subject to zero-order-hold or impulse parameterization, and the avoid set $\mathcal{P}$ is a polytope, RCS ε(t, τ) can be computed. Otherwise, RCS are intractable to compute.

Signed Distance: The signed distance of $z \subset \mathbb{R}^n$ with respect to a nonempty convex set $\mathcal{D} \subset \mathbb{R}^n$, denoted by $d_{\mathcal{D}}(z)$, is given by $$d_D(z) = \inf_{y \in \mathcal{D}} \|z - y\| - \inf_{x \notin \mathcal{D}^c} \|z - x\|. \tag{7}$$

A gradient of $d_{\mathcal{D}}$ evaluated at z, denoted by $\nabla d_{\mathcal{D}}(z)$, is given by $$\nabla d_D(z) = \frac{\left(z - z^{\partial \mathcal{D}}\right)^T}{d_D(z)}, \tag{8}$$

where $$z^{\partial \mathcal{D}} = \operatorname*{argmin}_{y \in \partial \mathcal{D}} \|z - y\|$$

is projection of z onto boundary of $\mathcal{D}$, denoted by $\partial \mathcal{D}$.

Consider a polytope of form: $\mathcal{D}=\{z\subset\mathbb{R}^n | Hz\le h\}$, where $H=[H_1 \ldots H_m]^T$ and $h=(h_1, \ldots, h_m)$, with $H_i\in\mathbb{R}^n$, $h_i\in\mathbb{R}$, for $i=1, \ldots, m$. Then $$d_{\mathcal{D}}(z)=\begin{cases}\min_{y\in\mathcal{D}}\|z-y\| & \text{if } z\notin\mathcal{D}\\ \min_{1\le i\le m}\frac{|H_i^\top z-h_i|}{\|H_i\|} & \text{otherwise}\end{cases}\tag{9}$$

where the first case amounts to solving an inequality-constrained QP and the second case is a simple algebraic enumeration spanning at most all faces of the polytope. Further, the projection of z onto the boundary of $\mathcal{D}$ is given by $$z^{\partial\mathcal{D}}=\begin{cases}\operatorname{argmin}_{y\in\mathcal{D}}\|z-y\| & \text{if } z\notin\mathcal{D}\\ z-\frac{(H_{i^*}^\top z-h_{i^*})}{\|H_{i^*}\|^2}H_{i^*} & \text{otherwise}\end{cases}\tag{10}$$

$$\text{where } i^*=\operatorname{argmin}_{1\le i\le m}|H_i^\top z-h_i|/\|H_i\|.$$

The RCS-based constraint (2) can be equivalently expressed with a signed-distance function, as follows $$x(t)\notin\mathcal{E}(t,\tau)\Leftrightarrow d_{\mathcal{E}(t,\tau)}(x(t))>0\tag{11}$$

for $\tau\in[0, \tau_f]$, $t\in[t_i, t_f]$, resulting in step 203 of FIG. 2. Next, using an isoperimetric reformulation of the RCS-based constraint via function $\Xi$: for each $t\in[t_i, t_f]$, yields $$d_{\mathcal{E}(t,\tau)}(x(t))>0\forall\ \tau\in[0,\tau_f],\ \Leftrightarrow\Xi(t,x(t))\triangleq\int_0^{\tau_f}|-d_{\mathcal{E}(t,\tau)}(x(t))|_+^2\,d\tau=0.\tag{12}$$

In one embodiment of the present disclosure, the nonlinear scalar valued metric of the RCS 105 is formulated as a chance constraint which requires that the constraint be satisfied with at least a priori specified probability level due to an uncertainty in the state of the vehicle 101. In effect, constraints on the nonlinear scalar valued metric of the RCS 105 are "tightened" based on a priori specified probability level and a covariance of uncertainty so that they move away from constraint boundary, giving a buffer region to account for the possibility that an expected state may in actuality be closer to the constraint boundary than estimated, thus guaranteeing that the state satisfies the constraint to a priori specified probability level.

Chance constraints: Consider a random state trajectory $\xi$, where $\xi(t)\sim\mathcal{N}(x(t), \Sigma(t))$ for $[t_i, t_f]$. Then the RCS-based constraint is imposed with some probability level $\beta\in(0,1)$ as follows $$\mathbb{P}(d_{\mathcal{E}(t,\tau)}(\xi(t))>0)\ge\beta,\ \tau\in[0,\tau_f],\ t\in[t_i,t_f].\tag{13}$$

A mean state trajectory is treated as a decision variable and the RCS are successively approximated for an affine system. The original nonlinear dynamics is linearized about a reference mean state trajectory $\bar{x}$ derived from a previous sequential convex programming iterate. The above chance constraint is approximated as $$\mathbb{P}(a(t,\tau)^\top\xi(t)+b(t,\tau)>0)\ge\beta,\ \tau\in[0,\tau_f],\ t\in[t_i,t_f],\tag{14}$$

where $$a(t,\tau)=\nabla d_{\mathcal{E}(t,\tau)}(\bar{x}(t))^\top$$
$$b(t,\tau)=d_{\mathcal{E}(t,\tau)}(\bar{x}(t))-a(t,\tau)^\top\bar{x}(t)$$

Since $\xi(t)$ is normally distributed for each $t\in[t_i, t_f]$, (14) is reformulated conservatively via ellipsoidal confidence sets as follows $$a(t,\tau)^\top x(t)+b(t,\tau)+c(t,\tau)\ge0\Longrightarrow\mathbb{P}(a(t,\tau)^\top\xi(t)+b(t,\tau)>0)\ge\beta\tag{15}$$

for each $\tau\in[0, \tau_f]$, where $$c(t,\tau)\triangleq-\sqrt{\mathcal{X}_{n_x}^2 a(t,\tau)^\top\sum(t)a(t,\tau)}\ \text{ and } \mathcal{X}_{n_x}^2$$

is a probability density function of a chi-squared distribution with $n_x$ degrees of freedom.

Further, function $\Xi$ is redefined in the isoperimetric reformulation step as follows $$\Xi(t,x(t),\bar{x}(t))\triangleq\int_0^{\tau_f}|-a(t,\tau)^\top x(t)-b(t,\tau)-c(t,\tau)|_+^2\,d\tau.\tag{16}$$

Optimal Control Problem: The following optimal control problem is solved:

$$\begin{aligned}&\underset{x,u}{\text{minimize}} && \int_{t_i}^{t_f}\|u(t)\|^2dt\\ &\text{subject to} && \dot{x}(t)=f(t,x(t),u(t)) \quad t\in[t_i,t_f]\\ &&& g(x(t),u(t))\le0 \quad t\in[t_i,t_f]\\ &&& \Xi(t,x(t))=0 \quad t\in[t_i,t_f]\\ &&& P(x(t_i),x(t_f))=0\end{aligned}\tag{17}$$

The process noise is excluded for simplicity. Besides the RCS-based constraints, the state trajectory is subject to path constraints defined by function g: $\mathbb{R}^{n_x}\times\mathbb{R}^{n_u}\rightarrow\mathbb{R}^{n_g}$, with $n_g=4$, which encodes upper-bound $u_{max}$ and lower-bound $u_{min}$ on control input magnitude, and an approach cone constraint with half cone angle $\theta_{ac}$ and cone axis $e_{ac}$, as follows $$g(x(t),u(t))\triangleq\begin{bmatrix}\|u(t)\|^2-u_{max}^2\\ u_{min}^2-\|u(t)\|^2\\ \|\cos\theta_{ac}^r Ex(t)\|^2-(e_{ac}^{\top r}Ex(t))^2\\ -e_{ac}^{\top r}Ex(t)\end{bmatrix},\tag{18}$$

where ${}^r E$ selects elements of x corresponding to chaser's position. Scalar-valued components of g are written in a form that ensures continuous differentiability of g, particularly a second-order-cone constraint.

Augmented Dynamical System: Given a state trajectory x and control input u over $[t_i, t_f]$ $$g(x(t), u(t)) \leq 0, \Xi(t, x(t)) = 0, \forall t \in [t_i, t_f], \Leftrightarrow \int_{t_i}^{t_f} \left(1_{n_g}^\top |g(x(t), u(t))|_+^2, \Xi(t, x(t))\right) dt = 0_2, \tag{19}$$

resulting in step 205 of FIG. 1. Note that $\Xi$ is not composed with an exterior penalty function since it is nonnegative everywhere.

For $t \in [t_i, t_f]$, a differential-algebraic system given by $$\dot{x}(t) = f(t, x(t), u(t)), \quad g(x(t), u(t)) \leq 0, \Xi(t, x(t)) = 0, \tag{20}$$

is equivalent to the following two-point boundary value problem $$\dot{x}(t) = f(t, x(t), u(t)), \quad \dot{y}(t) = \begin{bmatrix} 1_{n_g}^\top \left|g(x(t), u(t))\right|_+^2 \\ \Xi(t, x(t)) \end{bmatrix}, \quad y(t_i) = y(t_f), \tag{21}$$

where $\dot{y}(t)$ is an auxiliary dynamical system with state trajectory y for measuring cumulative continuous-time constraint violation. Periodic boundary conditions $y(t_i)=y(t_f)$, ensure that the path constraints are satisfied everywhere within $[t_i, t_f]$, resulting in the step 207 of FIG. 2.

The resultant boundary value problem is time-discretized and solved using a sequential convex programming algorithm with iterative convexification of the RCS 105.

Figure 3:
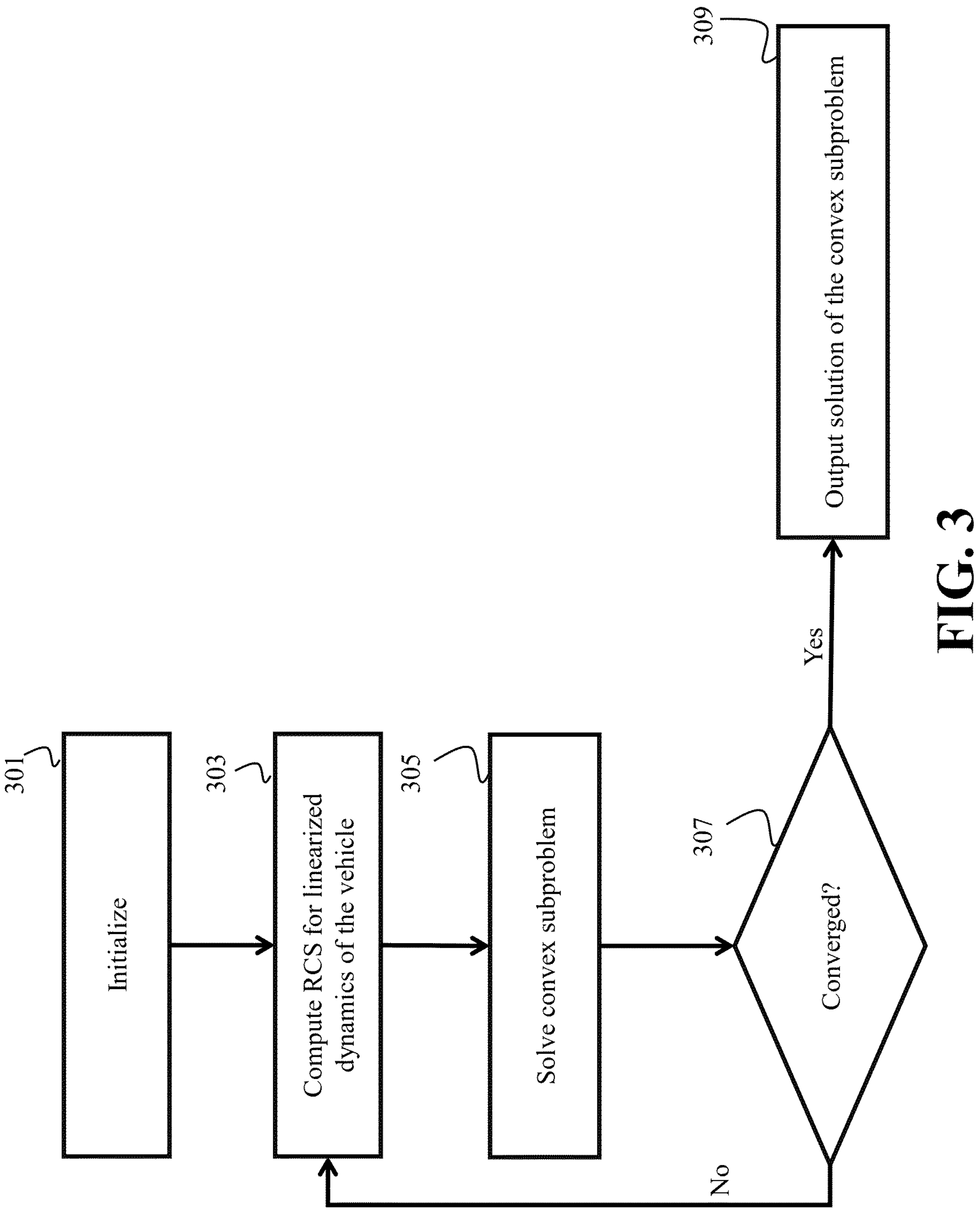
FIG. 3 is a block diagram illustrating steps for sequential convex programming with convexification of RCS at each iteration of the sequential convex programming, according to some embodiments of the present disclosure.

FIG. 3 is a block diagram illustrating steps for sequential convex programming with convexification of RCS $\varepsilon(t, \tau)$ at each iteration of the sequential convex programming, according to some embodiments of the present disclosure. At block 301, the processor 117 is configured to initialize the sequential convex programming to determine a trajectory for the vehicle 101. At block 303, the processor 117 is configured to compute the RCS 105 for the linear dynamics of the vehicle 101.

At block 305, the processor 117 is configured to solve the convex subproblems iteratively generated within the sequential convex programming. At block 307, the processor 117 is configured to check convergence. If converged, then, at block 309, the processor 117 outputs a solution of the subproblem. If not converged, the processor 117 executes next iteration in which the processor 117 accepts the current trajectory iterate and recomputes the RCS 105 for linearized dynamics of the vehicle 101 corresponding to the current trajectory iterate.

At convergence of the sequential convex programming, the trajectory computed for the linearized dynamics of the vehicle 101 also satisfies the original nonlinear dynamics of the vehicle 101. As a result, the trajectory satisfies RCS-based constraints 105 for the nonlinear dynamics of the vehicle 101.

The sequential convex programming with iterative convexification of the RCS 105 is mathematically described below.

Reformulated optimal control problem: Consider the following augmented dynamical system for $t \in [t_i, t_f]$ $$\dot{\tilde{x}}(t) = \tilde{f}(t, \tilde{x}(t), u(t)) \triangleq \begin{bmatrix} f(t, x(t), u(t)) \\ \|u(t)\|^2 \\ 1_{n_g}^\top |g(x(t), u(t))|_+^2 \\ \Xi(t, x(t)) \end{bmatrix} \tag{22}$$

where $\tilde{x} \triangleq (x, p, y)$ is an augmented state trajectory, and p accumulates a running cost in (17). Augmented state dimension is denoted by $n_{\tilde{x}}=n_x+3$. Selector matrices ${}^xE$, ${}^pE$, and ${}^yE$ are used to select elements of $\tilde{x}$ corresponding to x, p, and y, respectively.

The optimal control problem in (14) is reformulated to Mayer form using the augmented system (22) as follows.

$$\begin{aligned} \underset{\tilde{x},u}{\text{minimize}} \quad & {}^pE\tilde{x}(t_f) \\ \text{subject to} \quad & \dot{\tilde{x}}(t) = \tilde{f}(t, \tilde{x}(t), u(t)) \qquad t \in [t_i, t_f] \\ & {}^yE(\tilde{x}(t_f) - \tilde{x}(t_i)) = 0 \\ & P({}^xE\tilde{x}(t_i), {}^xE\tilde{x}(t_f)) = 0 \end{aligned} \tag{23}$$

Discretization & Solution Method: Consider a discretization grid of size N within $[t_i, t_f]$: $t_i=t_1< \ldots <t_N=t_f$. The augmented states $\tilde{x}_k$ at node points $t_k$ as decision variables, and denote them compactly as: $\tilde{X}=(\tilde{x}_1, \ldots, \tilde{x}_N)$.

The control input is parameterized via v: $[t_i, t_f] \to \mathbb{R}^{n_u}$ as follows $$v(t) = \sum_{k=1}^{N} u_k \Gamma_k^u(t), \tag{24}$$

with coefficients $u_k \in \mathbb{R}^{n_u}$ and basis functions $$\Gamma_k^u: [t_i, t_f] \to \mathbb{R},$$

for k=1, . . . , N.

The basis functions satisfy a property that within interval $[t_k, t_{k+1}]$, for any k=1, . . . , N, v is influenced solely by $u_k$ and $u_{k+1}$. Next, for k=1, . . . , N−1, $F_k: \mathbb{R}^{n_{\tilde{x}}} \times \mathbb{R}^{n_{\tilde{x}}} \times \mathbb{R}^{n_u} \times \mathbb{R}^{n_u} \to \mathbb{R}^{n_{\tilde{x}}}$ is defined as follows $$F_k(\tilde{x}_{k+1}, \tilde{x}_k, u_{k+1}, u_k) = \tilde{x}_{k+1} - \tilde{x}_k - \int_{t_k}^{t_{k+1}} \tilde{f}\left(\tilde{x}^k(t), v(t)\right) dt, \tag{25}$$

where the augmented state trajectory $\tilde{x}^k$ satisfies (22) on $[t_k, t_{k+1}]$ with control input v, and initial condition $\tilde{x}_k$. Then, discretization of (23), yields $$F_k(\tilde{x}_{k+1}, \tilde{x}_k, u_{k+1}, u_k) = 0, \quad {}^yE(\tilde{x}_{k+1} - \tilde{x}_k) = 0, \tag{26}$$

However, inclusion of (26) as constraints in the optimal control problem leads to violation in linear independence constraint qualification (LICQ), which is essential for enabling exact penalization. Further, (26) is relaxed to an inequality via a constant $\epsilon>0$. Then (23) transforms under discretization and control input parameterization as follows.

$$\begin{aligned} \underset{\tilde{x}_k, u_k j}{\text{minimize}} \quad & {}^{p}E\tilde{x}_N & & \\ \text{subject to} \quad & F_k(\tilde{x}_{k+1}, \tilde{x}_k, u_{k+1}, u_k) = 0 & & k = 1, \ldots, N-1 \\ & {}^{y}E(\tilde{x}_{k+1} - \tilde{x}_k) \le \epsilon & & k = 1, \ldots, N-1 \\ & u_k \in \mathbb{U} & & k = 1, \ldots, N \\ & P({}^{x}E\tilde{x}_1, {}^{x}E\tilde{x}_N) = 0 & & \end{aligned} \tag{27}$$

Compact and convex set $\mathbb{U}$ serves a three-fold purpose: (i) representing convex constraints on the control input; (ii) establishing a pointwise bound on the path constraint violation as a consequence of relaxation ${}^{y}E(\tilde{x}_{k+1}-\tilde{x}_k)\le\epsilon$; and (iii) invoking convergence guarantees of prox-linear method. Next, an unconstrained optimization problem is constructed based on (27) where nonconvex constraint $F_k(\tilde{x}_{k+1}, \tilde{x}_k, u_{k+1}, u_k)=0$ is penalized with $l_1$-norm and the convex constraints are represented with indicator functions. The unconstrained optimization problem fits a template of convex-composite minimization which allows to use a sequential convex programming algorithm called the prox-linear method.

Sequential Convex Programming (SCP): The prox-linear method, an SCP algorithm, is adopted to solve:

$$\begin{aligned} \underset{x_k, u_k}{\text{minimize}} \quad & {}^{p}(E\tilde{x}_N) + w_{ep}\|P({}^{x}E\tilde{x}(t_i), {}^{x}E\tilde{x}(t_f)\|_1 + \\ & w_{ep}\sum_{k=1}^{N-1}\|F_k(\tilde{x}_{k+1}, \tilde{x}_k, u_{k+1}, u_k)\|_1 \\ \text{subject to} \quad & {}^{y}E(\tilde{x}_{k+1} - \tilde{x}_k) \le \epsilon \\ & u_k \in \mathbb{U} \end{aligned}$$

where the nonconvex constraints of (27) are exactly penalized with $\ell_1$-norm. For a large enough, finite $w_{ep}$, a solution of (28) that is feasible with respect to $F_k(\tilde{x}_{k+1}, \tilde{x}_k, u_{k+1}, u_k)=0$ is also a solution of (27).

The penalized problem (28) can be compactly stated as:

$$\underset{Z\in\mathcal{Z}}{\text{minimize}}\ L(Z) + w_{ep}\|G(Z)\|_1 \tag{29}$$

where $Z=(\tilde{x}_1, \ldots, \tilde{x}_N, u_1, \ldots, u_N)$ and $\mathcal{Z}$ is a convex set corresponding to constraints in (28).

The prox-linear method determines a stationary point of (29) by solving a sequence of convex subproblems. At iteration j+1, it solves the following convex problem:

$$\underset{Z\in\mathcal{Z}}{\text{minimize}}\ L(Z) + w_{ep}\left\|G(Z^j) + \nabla G(Z^j)(Z - Z^j)\right\|_1 + \frac{w_{prox}}{2}\left\|Z - Z^j\right\|_2^2 \tag{30}$$

where $Z^j$ is a solution from iteration j. The sequence $Z^j$ can be shown to converge for an appropriate choice of a proximal term weight $w_{prox}$. Further, if converged point is feasible for (27), then it is also a KKT point.

There are two important steps in construction of each convex subproblem—(1) computation of $\nabla G$: a gradient of $f_k$ with respect to the previous iterate, and (2) prescaling and preconditioning. The convex subproblem is then solved using a solver such as ECOS, Gurobi, or Mosek.

Gradient of Discretized Dynamics: At each iteration of SCP, discretized dynamics constraint $F_k(\tilde{x}_{k+1}, \tilde{x}_k, u_{k+1}, u_k)=0$ is linearized with respect to the previous iterate, denoted by $$\bar{\tilde{x}}_k,$$

$\bar{u}_k$, for k=1, . . . , N.

For each k=1, . . . , N−1, let $\bar{\tilde{x}}^k(\tau)$ denote the solution to (22) over $[\tau_k, \tau_{k+1}]$ generated with initial condition $$\bar{\tilde{x}}_k$$

and control input $\bar{v}(\tau)$, which is parameterized using $\bar{u}_k$, for k=1, . . . , N. In general, $$\bar{\tilde{x}}^k(\tau_{k+1}) \ne \bar{\tilde{x}}_{k+1}$$

before SCP converges.

Jacobians of $\tilde{f}$ in (22), evaluated with respect to $$\bar{\tilde{x}}^k(\tau),$$

$\bar{u}(\tau)$, are denoted by:

$$\begin{aligned} A^k(\tau) &= \frac{\partial \tilde{f}\left(\bar{\tilde{x}}^k(\tau), \bar{u}(\tau)\right)}{\partial x} \\ B^k(\tau) &= \frac{\partial \tilde{f}\left(\bar{\tilde{x}}^k(\tau), \bar{u}(\tau)\right)}{\partial u} \end{aligned} \tag{31}$$

for $\tau\in[\tau_k, \tau_{k+1}]$.

The discretized dynamics constraint $F_k(\tilde{x}_{k+1}, \tilde{x}_k, u_{k+1}, u_k)=0$ is linearized as follows:

$$\tilde{x}_{k+1} = A_k\tilde{x}_k + B_k^- u_k + B_k^+ u_{k+1} + w_k \tag{32}$$

for k=1, . . . , N−1, where $A_k$, $$B_k^-, B_k^+,$$

$w_k$ result from the solution to the following initial value problem over $\tau\in[_k, \tau_{k+1}]$:

$$\begin{aligned} \mathring{\Phi}_x(\tau, \tau_k) &= A^k(\tau)\Phi_x(\tau, \tau_k) \\ \mathring{\Phi}_{\bar{u}}(\tau, \tau_k) &= A^k(\tau)\Phi_{\bar{u}}(\tau, \tau_k) + B^k(\tau)\left(\frac{\tau_{k+1}-\tau}{\tau_{k+1}-\tau_k}\right) \\ \mathring{\Phi}_u^+(\tau, \tau_k) &= A^k(\tau)\Phi_u^+(\tau, \tau_k) + B^k(\tau)\left(\frac{\tau-\tau_k}{\tau_{k+1}-\tau_k}\right) \\ \Phi_x(\tau_k, \tau_k) &= I_{n_x} \\ \Phi_{\bar{u}}(\tau_k, \tau_k) &= 0_{n_x\times n_u} \end{aligned} \tag{33}$$

-continued $$\Phi_u^+(\tau_k, \tau_k) = 0_{n_x \times n_u}$$

$$A_k = \Phi_x(\tau_{k+1}, \tau_k)$$

$$B_k^- = \Phi_u(\tau_{k+1}, \tau_k)$$

$$B_k^+ = \Phi_u^+(\tau_{k+1}, \tau_k)$$

$$w_k = \bar{\bar{x}}^k(\tau_{k+1}) - A_k \bar{\bar{x}}_k - B_k^- \bar{u}_k - B_k^+ \bar{u}_{k+1}$$

Approximation of RCS: Numerically computing the RCS 105 for nonlinear systems (e.g., vehicle 101) is in general intractable. The SCP approach successively approximates ε(t, τ) for linear dynamics of the system at each iteration of SCP. At convergence, the state trajectory computed for the linear dynamics of the system also satisfies nonlinear dynamics of the system. As a result, the state trajectory satisfies constraints with respect to the RCS-based constraints of the nonlinear dynamics of the system. The RCS computed for a linearized system can be inflated using the Lagrange remainder to ensure validity of the RCS-based constraints within a tube around the state trajectory.

In an embodiment, the vehicle 101 is a spacecraft and the controller 115 is configured to control spacecraft rendezvous with the target 103 according to the trajectory while ensuring passive safety of the spacecraft. In a safe spacecraft rendezvous scenario, avoidance sets (i.e. keep-away zone) are computed using RCS emanating from a target region specified around the target 103. By enforcing the spacecraft to be outside of these avoidance sets the spacecraft ensures passive safety or abort-safety, such that in an event of total or partial loss of thrust control, the spacecraft is outside the keep-away zone and does not drift towards the target, thereby ultimately avoiding collision.

Figure 4A:
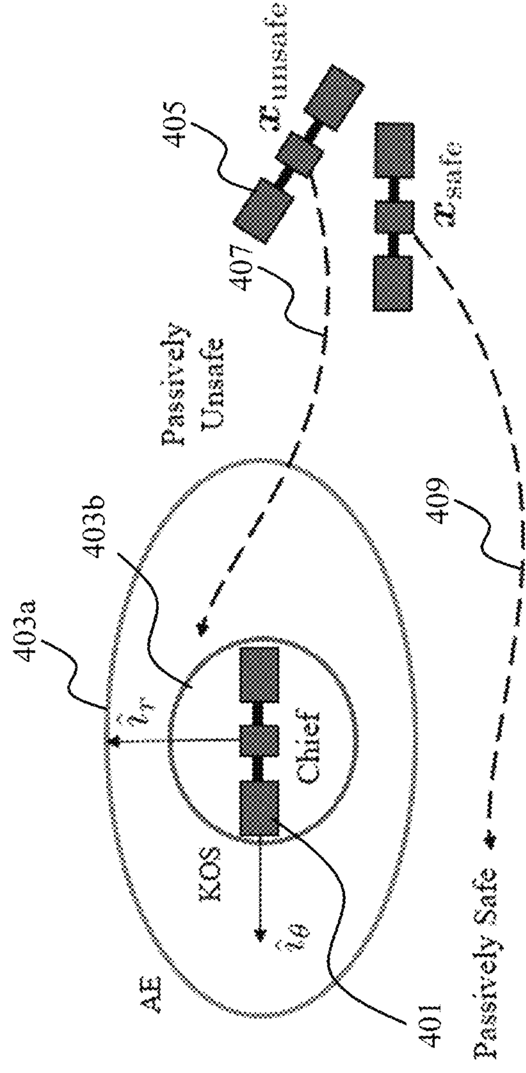
FIG. 4A is a schematic illustrating trajectories that are passively safe and passively unsafe with respect to regions around a target, according to some embodiments of the present disclosure.

FIG. 4A is a schematic illustrating spacecraft rendezvous trajectories that are passively safe and passively unsafe with respect to regions around a target 401, also known as a chief, according to some embodiments of the present disclosure. In this example, regions 403*a* and 403*b* around the target 401 are given by an approach ellipsoid (AE) and a keep-out sphere (KOS). For a chaser spacecraft 405, a trajectory 407 is passively unsafe, which means the trajectory 405 of the chaser spacecraft 405 doesn't ensure passive safety. The trajectory 409 of the chaser spacecraft 405 is passively safe.

Figure 4B:
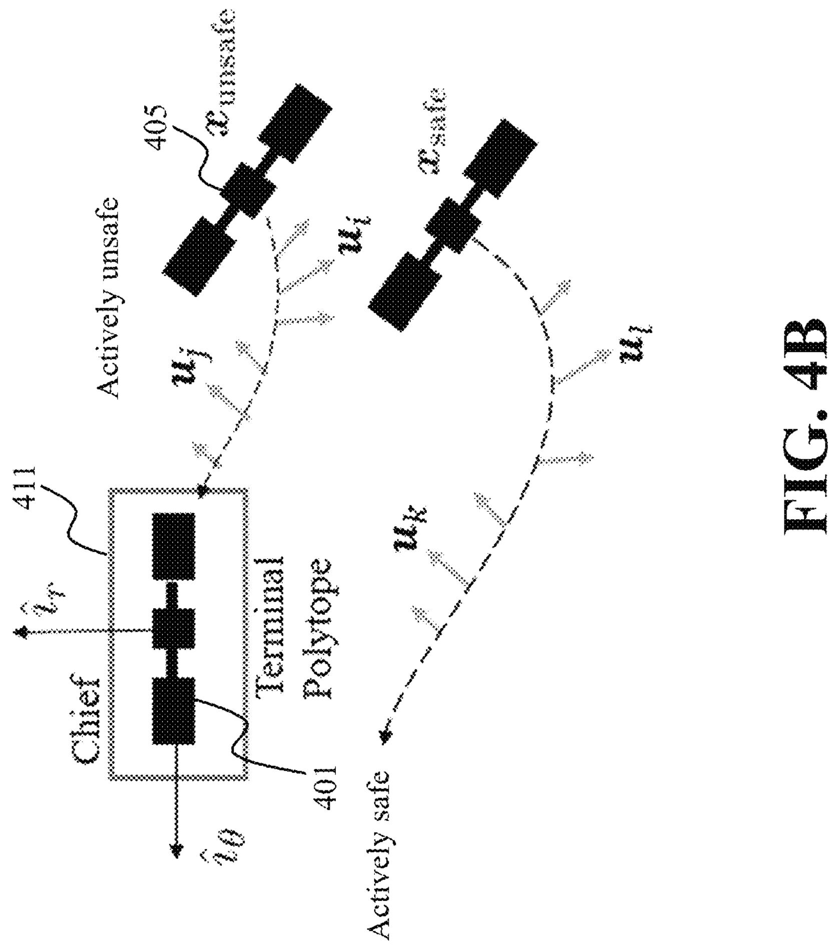
FIG. 4B is a schematic illustrating trajectories that are actively safe and actively unsafe with respect to a terminal polytope 411, according to an embodiments of the present disclosure.

FIG. 4B is a schematic illustrating trajectories that are actively safe and actively unsafe with respect to a terminal polytope 411, according to an embodiments of the present disclosure. In an embodiment, uncontrolled translational motion (free-drift) of the chaser spacecraft 405 in cis-lunar space, which considers ephemeris states (position and velocity) of Moon, Earth, and Sun, higher-order gravitational perturbations (Moon J2), and solar radiation pressure (SRP), is represented in Moon-centered J2000 inertial frame by $$\dot{z}(t) = \frac{dz(t)}{dt} = \check{f}(t, z(t)), \; t \in [t_i, t_f], \tag{34}$$

where $t_i$ and $t_f$ are initial and final time, respectively. Let $n_x=6$ and $n_u=3$ denote state and control input dimensions, respectively. The state trajectory x of the chaser spacecraft 405 relative to a given free-drift state trajectory $\check{z}$ of a target spacecraft satisfies $$\dot{x}(t) = f(t, x(t), u(t)) \triangleq \check{f}(t, x(t) + \check{z}(t)) - \check{f}(t, \check{z}(t)) + \begin{bmatrix} 0_{n_u \times n_u} \\ I_{n_u} \end{bmatrix} u(t), \; t \in [t_i, t_f], \tag{35}$$

where u is a piecewise continuous control input acting on the chaser spacecraft 405, which is either a velocity impulse or an acceleration.

Consider a polytopic avoid set $\mathcal{P} \triangleq \text{int}\{\zeta \in \mathbb{R}^{n_x} | H\zeta \le h\}$, for some $H \triangleq [H_1 \ldots H_m]^T \in \mathbb{R}^{m \times n_x}$ and $h \triangleq (h_1, \ldots, h_m) \in \mathbb{R}^m$. The free-drift state trajectory of the chaser spacecraft 405, starting at time $t \in [t_i, t_f]$, shall not enter $\mathcal{P}$ for a safety duration of $t_s$. Given a state trajectory x for the chaser spacecraft 405 over $[t_i, t_f]$, the free-drift state trajectory $x^t$, starting from x(t) at $t \in [t_i, t_f]$, satisfies $$\dot{x}^t(\tau) = \frac{dx^t(\tau)}{d\tau} = f(t + \tau, x^t(\tau), 0_{n_u}), \; \tau \in [0, t_s], \tag{36}$$

with initial condition $x^t(0)=x(t)$. Then passive safety constraint is given by $$x^t(\tau) \notin \mathcal{P}, \;\; \forall \, \tau \in [0, t_s], \, t \in [t_i, t_f], \tag{37}$$

Or equivalently, for any $t \in [t_i, t_f]$, $$x(t) \notin \bigcup_{\tau \in [0, t_s]} \mathcal{B}_\tau^t, \tag{38}$$

where the backward reachable set (BRS)

$$\mathcal{B}_\tau^t$$

is the set of all states at time t which free-drift into $\mathcal{P}$ after a duration of τ. Equation (38) is the same form as equation (11) and procedure described in solution methods disclosed in FIGS. 2 and 3 are used to reformulate (38) into isoperimetric form and solve an optimal control problem of the form of (27) to find minimum-fuel spacecraft rendezvous trajectories that are passively safe at all times.

Figure 5A:
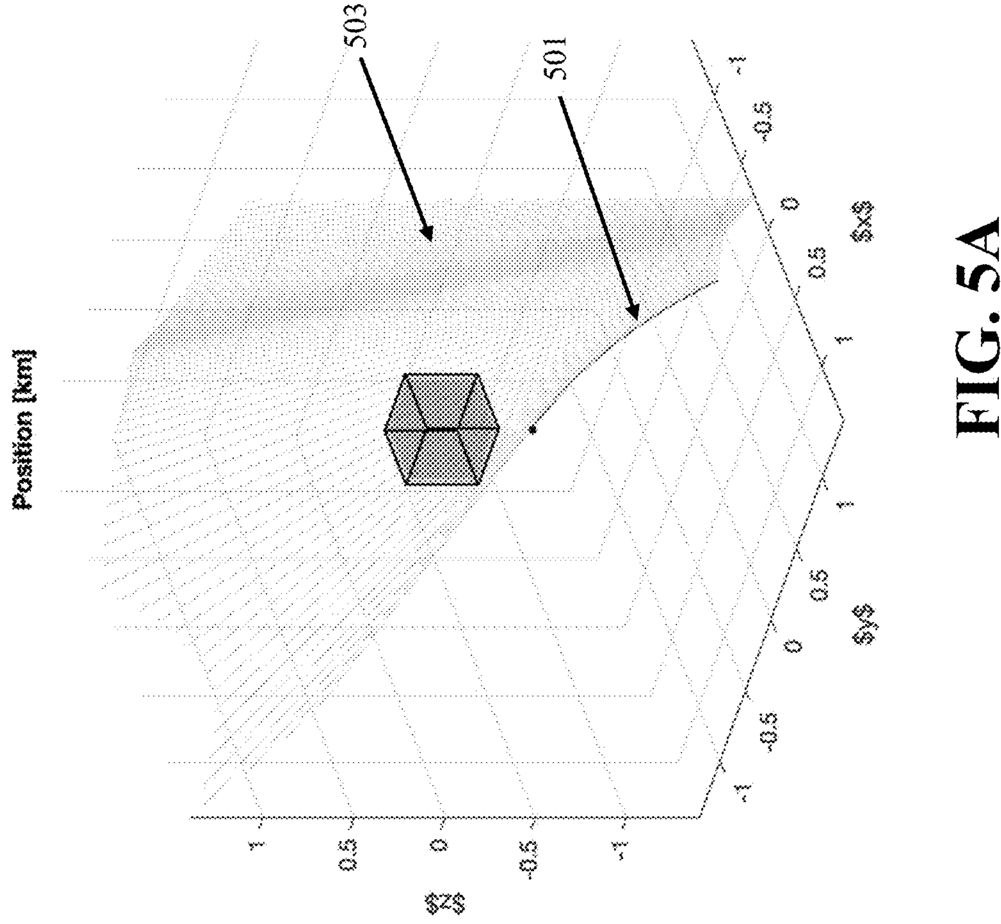
FIG. 5A is a graph illustrating an exemplary rendezvous trajectory with free drift trajectories that avoid the region around the target in continuous time, according to some example embodiments of the present disclosure.

To demonstrate effectiveness of the solution method disclosed in embodiments herein, a simulation result is presented. FIG. 5 is a graph illustrating an exemplary rendezvous trajectory 501 with free drift trajectories 503 that avoid a region around the target in continuous time.

Figure 5B:
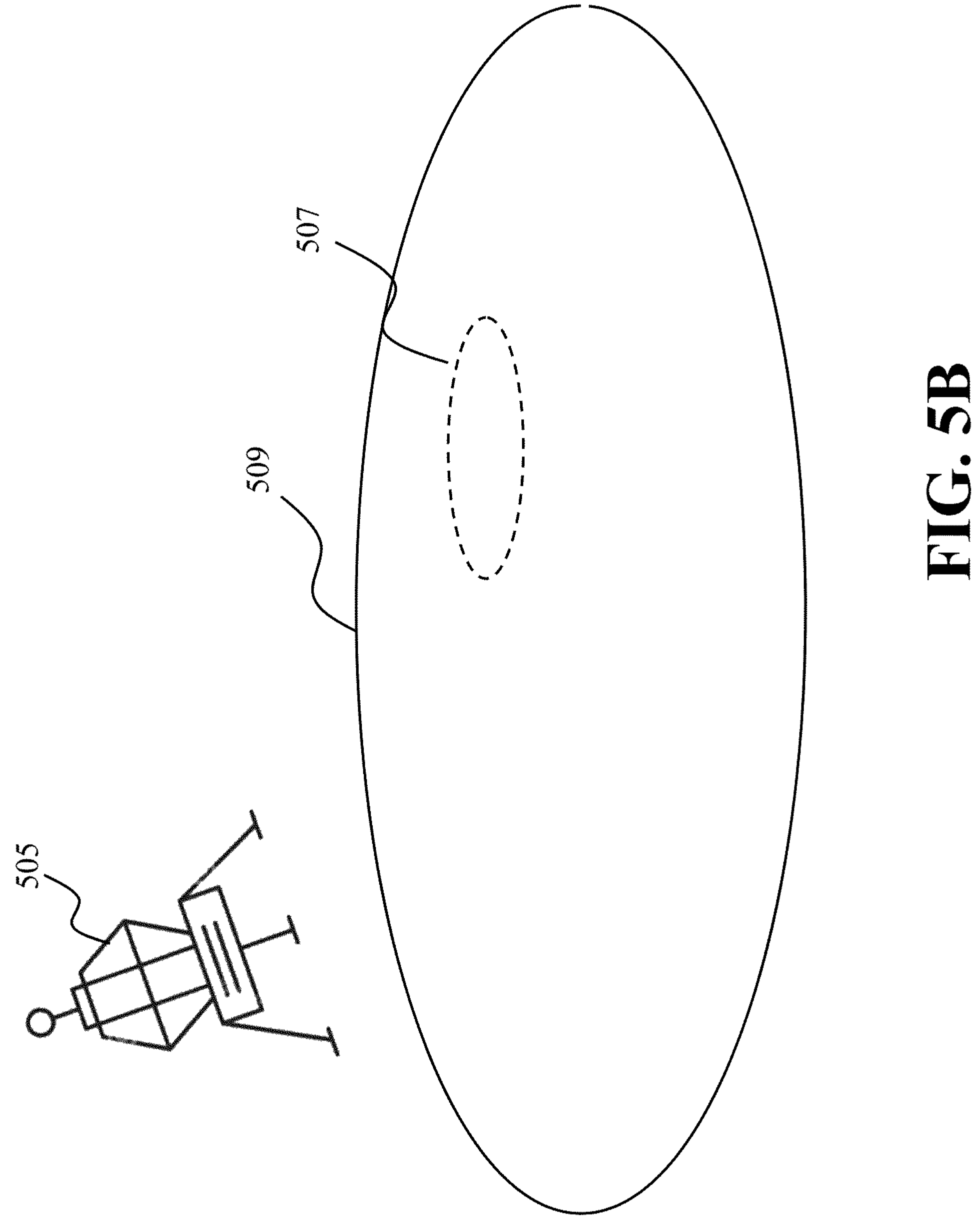
FIG. 5B illustrates a landing operation, according to an embodiment of the present disclosure.

In some embodiments, the vehicle 101 is a lander and the controller 115 is further configured to control a landing operation of the lander while ensuring passive safety of the lander. FIG. 5B illustrates the landing operation, according to an embodiment of the present disclosure. For example, in planetary landing applications, powered descent guidance (PDG) is used to guide a lander 505 to a landing site 507 located on ground of a celestial body 509. In case of PDG problem, sudden loss of actuation, i.e., engine thrust, is a realistic failure mode. For instance, liquid rocket engines shut off if throttle level is too low, and more recently, Smart Lander for Investigating Moon (SLIM) lander's engine abruptly shut-off moments before touchdown. Passive safety for the lander 505 requires that a free-drift trajectory of the lander 505 (after loss of actuation of the lander) does not enter a keep-away zone, e.g. sensitive infrastructure around the landing site 507, for a specified time duration. According to some embodiments, the controller 115 is configured to determine such a trajectory and control the landing operation of the lander 505 according to the trajectory while ensuring passive safety of the lander 505.

In some other embodiments, the vehicle 101 is a marine vehicle. The marine vehicle may be a cargo ship, a passenger ship, a fishing vessel, a supply vessel, or a warship. The marine vehicle can be an autonomous or semi-autonomous vehicle. The controller 115 is configured to control an operation of the marine vehicle according to a trajectory while ensuring passive safety of the marine vehicle. The operation of the marine vehicle, for example, includes traversing from its current location to a target location. The passive safety of the marine vehicle ensures that the trajectory of the marine vehicle (after loss of actuation of the marine) does not enter a keep-away zone around the target location.

In yet some other embodiments, the vehicle 101 is a ground vehicle and the controller 115 is configured to control an operation of the ground vehicle according to a trajectory that avoids collision with obstacles of the ground vehicle.

Figure 6A:
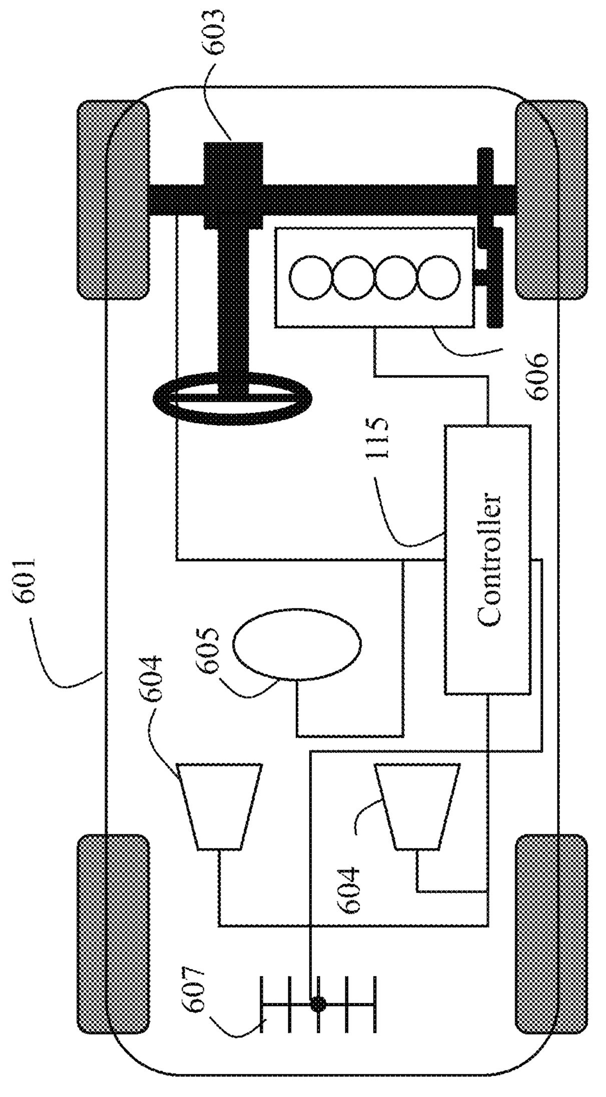
FIG. 6A shows a schematic of a vehicle including the controller for controlling the vehicle, according to some embodiments of the present disclosure.

FIG. 6A shows a schematic of a vehicle 601 including the controller 115, according to some embodiments of the present disclosure. As used herein, the vehicle 601 can be any type of ground vehicle, such as a passenger car, bus, or rover. Also, the vehicle 601 can be an autonomous or semi-autonomous vehicle. For example, some embodiments control the motion of the vehicle 601. Examples of the motion include lateral motion of the vehicle 601 controlled by a steering system 603 of the vehicle 601. In one embodiment, the steering system 603 is controlled by the controller 115. Additionally or alternatively, the steering system 603 can be controlled by a driver of the vehicle 601.

The vehicle 601 can also include an engine 606, which can be controlled by the controller 115 or by other components of the vehicle 601. The vehicle can also include one or more sensors 604 to sense the surrounding environment. Examples of the sensors 604 include distance range finders, radars, lidars, and cameras. The vehicle 601 can also include one or more sensors 605 to sense its current motion quantities and internal status. Examples of the sensors 605 include global positioning system (GPS), accelerometers, inertial measurement units, gyroscopes, shaft rotational sensors, torque sensors, deflection sensors, pressure sensor, and flow sensors. The sensors provide information to the controller 115. The vehicle can be equipped with a transceiver 607 enabling communication capabilities of the controller 115 through wired or wireless communication channels.

Figure 6B:
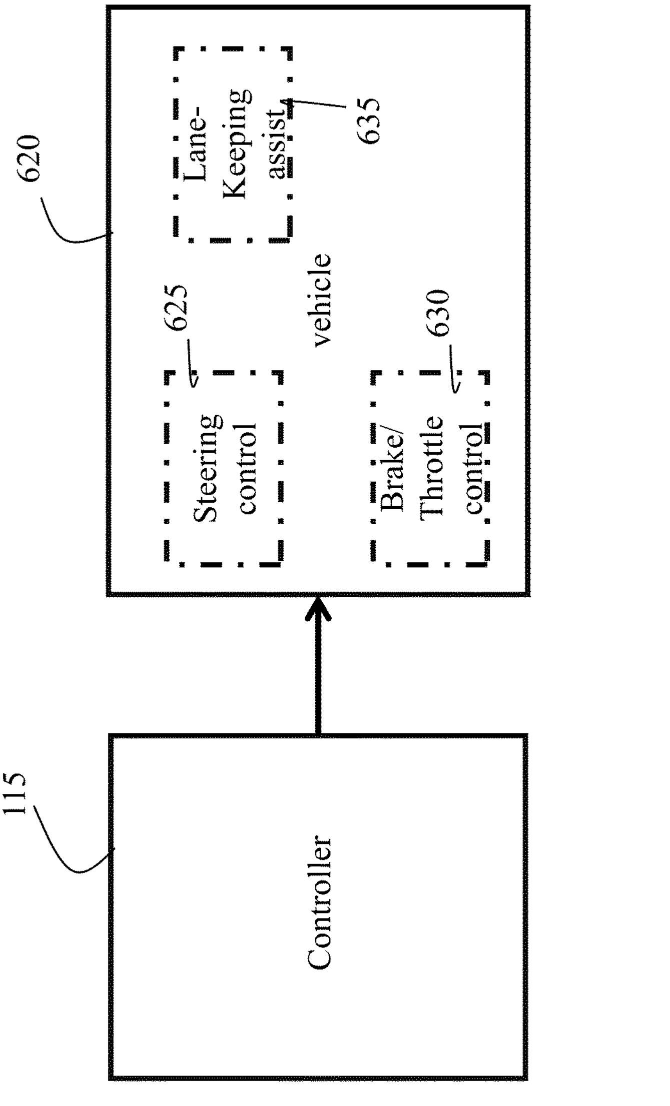
FIG. 6B shows a schematic of interaction between the controller and controllers of the vehicle, according to some embodiments of the present disclosure.

FIG. 6B shows a schematic of interaction between the controller 115 and controllers 620 of the vehicle 601, according to some embodiments. For example, in some embodiments, the controllers 620 of the vehicle 601 are steering controller 625 and brake/throttle controllers 630 that control rotation and acceleration of the vehicle 601. In such a case, the controller 115 outputs control commands to the controllers 625 and 630 to control a state of the vehicle 601 such as acceleration, orientation, and the like, for controlling motion of the vehicle 601. The controllers 620 can also include high-level controllers, e.g., a lane-keeping assist controller 635 that further process the control commands of the controller 115. In both cases, the controllers 620 maps use the control commands of the controller 115 to control at least one actuator of the vehicle 601, such as the steering wheel and/or the brakes of the vehicle 601, in order to control the motion of the vehicle 601.

Figure 6C:
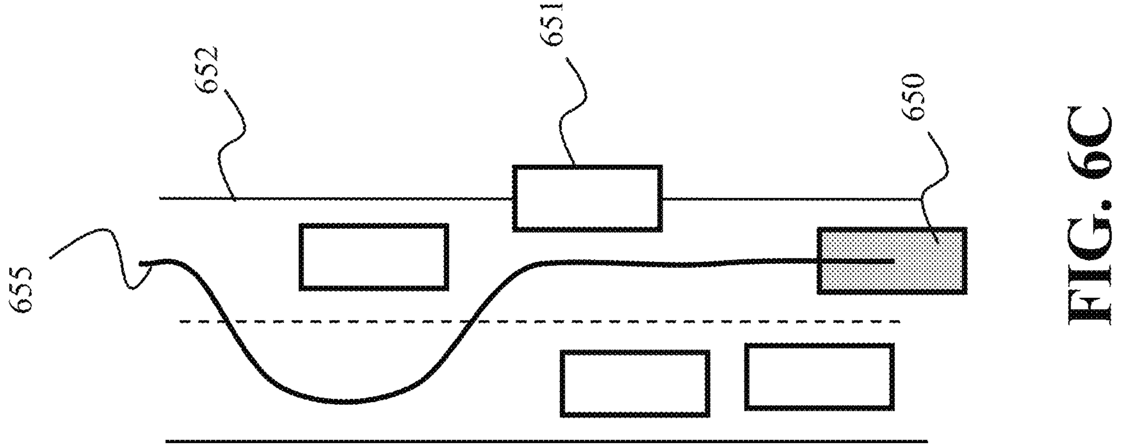
FIG. 6C shows a schematic of motion planning for the vehicle, according to some embodiments of the present disclosure.

FIG. 6C shows a schematic of an autonomous or semi-autonomous vehicle 650 controlled by the controller 115, for which a dynamically feasible and optimal trajectory 655 can be computed by the controller 115 by using principles of some embodiments. The generated trajectory 655 aims to keep the vehicle 650 within particular road bounds 652, and aims to avoid collision with other uncontrolled vehicles 651 acting as obstacles of the controlled vehicle 650.

Figure 7:
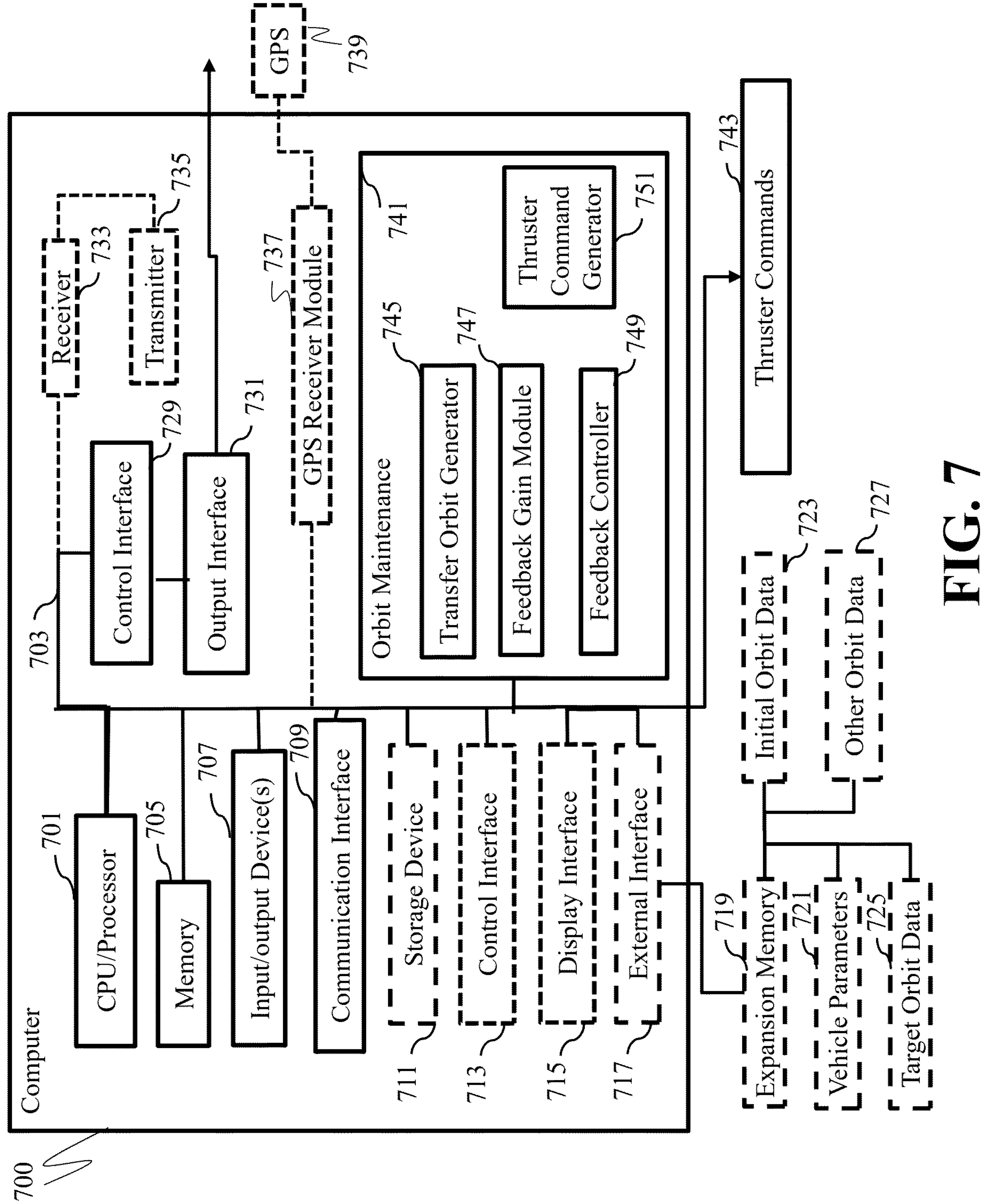
FIG. 7 is a schematic diagram illustrating some components used for implementing methods and systems of the present disclosure.

FIG. 7 is a schematic diagram illustrating some components used for implementing the methods and the systems of the present disclosure. For example, a computer 700 can be adapted for controlling the operation of the spacecraft 405 in the multi-object celestial system while ensuring passive safety. A CPU or processor(s) 701 can be connected via a bus system 703 to a memory 705, input/output devices 707 and a communication interface 709. Also, connected to the bus system 703 can be a storage device 711, a control interface 713, display interface 715, and an external interface 717.

The external interface 717 can be connected to an expansion memory 719, vehicle parameters 721 (i.e. spacecraft specifications, thruster specifications, size, weight, etc.), initial orbit data 723 (i.e. time, date, parameters including altitude, inclination, eccentricity, etc.), target orbit data 725, and other orbit data 727 (i.e. unique orbit data). The bus system 703 can also connect a control interface 729, an output interface 731, a receiver 733 and a transmitter 735. Further, the bus system 703 can connect a GPS receiver module 737 to a GPS 739. The computer 700 includes an orbit maintenance module 741. The orbit maintenance module 741 may output thruster commands 743. The orbit maintenance module 741 includes a transfer orbit generator 745, a feedback gain module 747, a feedback controller 749, and a thruster command generator 751.

The computer 700 can be a server or a desktop, a laptop, a mobile or other computer device or system with one or more processors 701. The processor 701 may be a central processing unit adapted for accessing code in the form of the transfer orbit generator 745 in the memory 705 or storage device 711 of the computer 700 (or in an expansion memory 719). Contemplated are external storage devices if further required depending upon the specific design and aspect of an intended hardware and goal implementation, according aspects related to the systems and the methods of the present disclosure. For example, the computer 700 can be used to implement the steps of the systems and methods, where the memory 705, and/or storage device 711 can store data.

The stored data in the memory 705 can include executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space.

Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, the space data can include data about the moons of celestial body(s), such as characteristics of celestial body(s) that can be taken into consideration in developing orbital designs from an initial celestial body(s) orbit to a similar target celestial body(s) orbit.

The processor 701 of the computer 700 may be two or more processors depending upon the specific application. For example, some steps may require a separate processor to ensure a specific processing time or processing speed associated with the systems and methods of the present disclosure. The receiver 733 or input interface can receive space data that may be up-to-date space data, obtained from either an Earth Mission Control Center or sensors associated with the spacecraft, or some other location, after the stored historical space data stored in the memory 705. The receiver 733 and the transmitter 735 can provide a wireless venue for receiving and sending data to, for example, an Earth Mission Control Center, or some other destination. The GPS receiver module 737 connected to the GPS 739 can be used for navigation related aspects. The computer 700 may further include external devices, control interfaces, displays, sensors, machines, etc., that are contemplated for uses related to the systems and methods of the present disclosure.

Figure 8:
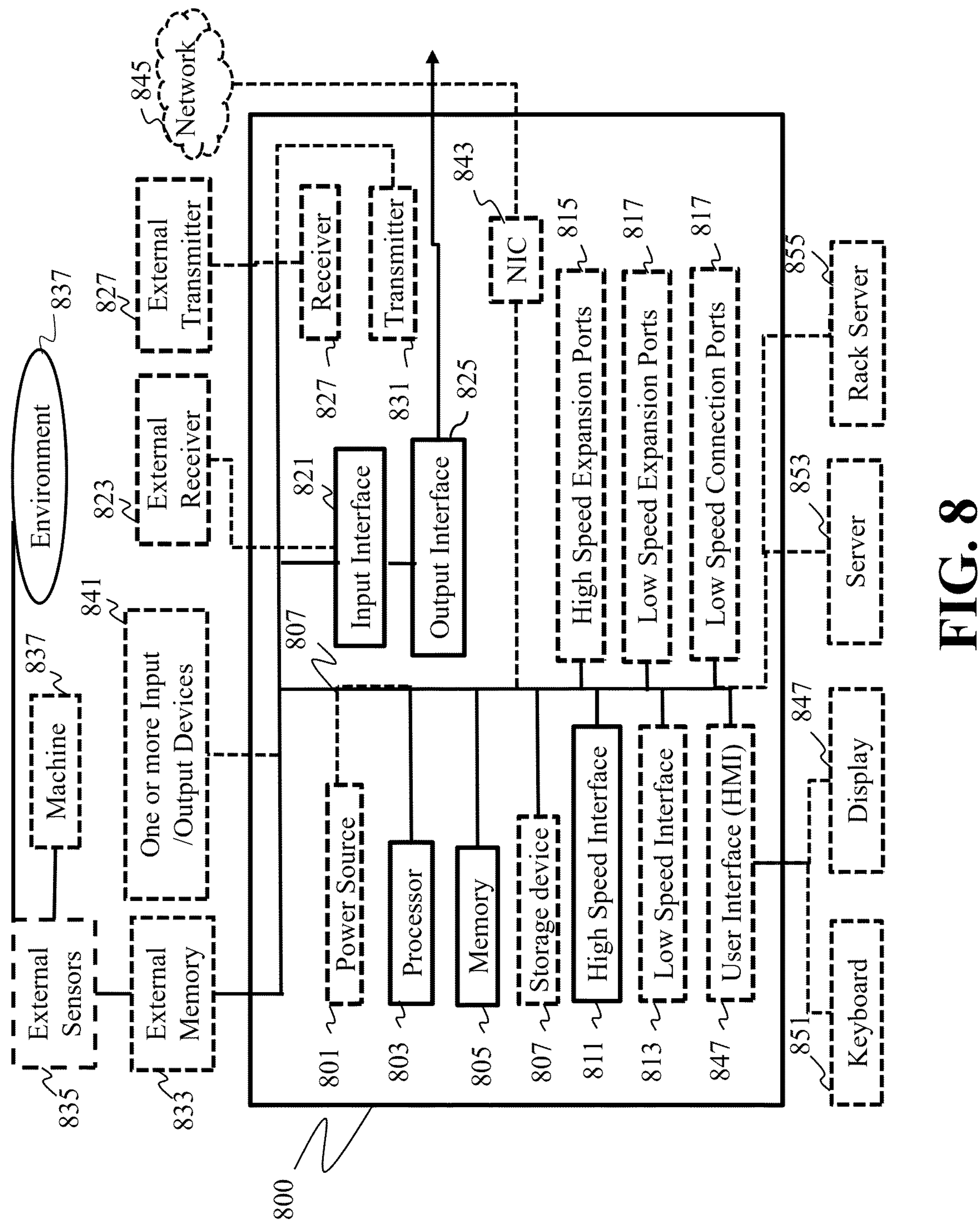
FIG. 8 is a schematic illustrating by non-limiting example a computing apparatus for implementing the methods and the systems of the present disclosure.

FIG. 8 is a schematic illustrating by non-limiting example a computing apparatus for implementing the methods and the systems of the present disclosure. The computing device 800 can include a power source 801, a processor 803, a memory 805, a storage device 807, all connected to a bus 809. Further, a high-speed interface 811, a low-speed interface 813, high-speed expansion ports 815 and low speed connection ports 817, can be connected to the bus 809. In addition, a low-speed expansion port 819 is in connection with the bus 809. Further, an input interface 821 can be connected via the bus 809 to an external receiver 823 and an output interface 825. A receiver 827 can be connected to an external transmitter 829 and a transmitter 831 via the bus 809. Also connected to the bus 809 can be an external memory 833, external sensors 835, machine(s) 837, and an environment 839. Further, one or more external input/output devices 841 can be connected to the bus 809. A network interface controller (NIC) 843 can be adapted to connect through the bus 809 to a network 845, wherein data or other data, among other things, can be rendered on a third-party display device, third party imaging device, and/or third-party printing device outside of the computer device 800.

The memory 805 can store instructions that are executable by the computer device 800, historical data, and any data that can be utilized by the methods and systems of the present disclosure. The memory 805 can include random access memory (RAM), read only memory (ROM), flash memory, or any other suitable memory systems. The memory 805 can be a volatile memory unit or units, and/or a non-volatile memory unit or units. The memory 805 may also be another form of computer-readable medium, such as a magnetic or optical disk.

The storage device 807 can be adapted to store supplementary data and/or software modules used by the computer device 800. For example, the storage device 807 can store historical data and other related data as mentioned above regarding the present disclosure. Additionally, or alternatively, the storage device 807 can store historical data like data as mentioned above regarding the present disclosure. The storage device 807 can include a hard drive, an optical drive, a thumb-drive, an array of drives, or any combinations thereof. Further, the storage device 807 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 803), perform one or more methods, such as those described above.

The computing device 800 can be linked through the bus 809, optionally, to a display interface or user Interface (HMI) 847 adapted to connect the computing device 800 to a display device 849 and a keyboard 851, wherein the display device 849 can include a computer monitor, camera, television, projector, or mobile device, among others. In some implementations, the computer device 800 may include a printer interface to connect to a printing device, wherein the printing device can include a liquid inkjet printer, solid ink printer, large-scale commercial printer, thermal printer, UV printer, or dye-sublimation printer, among others.

The high-speed interface 811 manages bandwidth-intensive operations for the computing device 800, while the low-speed interface 813 manages lower bandwidth-intensive operations. Such allocation of functions is an example only. In some implementations, the high-speed interface 811 can be coupled to the memory 805, the user interface (HMI) 847, and to the keyboard 851 and the display 849 (e.g., through a graphics processor or accelerator), and to the high-speed expansion ports 815, which may accept various expansion cards via the bus 809. In an implementation, the low-speed interface 813 is coupled to the storage device 807 and the low-speed expansion ports 817, via the bus 809. The low-speed expansion ports 817, which may include various communication ports (e.g., USB, Bluetooth, Ethernet, wireless Ethernet) may be coupled to the one or more input/output devices 841. The computing device 800 may be connected to a server 853 and a rack server 855. The computing device 800 may be implemented in several different forms. For example, the computing device 800 may be implemented as part of the rack server 855.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A controller for controlling an operation of a vehicle subject to constraints based on continuously parametrized sets (CPS), the controller comprising: at least one processor; and a non-transitory memory having instructions stored thereon that, when executed by the at least one processor, cause the controller to:

determine a trajectory for the vehicle using an isoperimetric reformulation of the constraints based on the CPS, wherein the trajectory is iteratively updated with successive approximations of the CPS using linearized dynamics of the vehicle corresponding to a current trajectory iterate, wherein the CPS are robust controllability sets (RCS) that are continuously parametrized by propagation time for trajectory horizon (t) and safety horizon (τ), and wherein the isoperimetric reformulation presents constraints based on the RCS as a double integral over the trajectory horizon and the safety horizon of a distance between the vehicle and a keep-away zone and reformulates the double integral as a boundary value problem over the trajectory horizon; and control the vehicle according to the trajectory.

2. The controller of claim 1, wherein the RCS are backwards reachable sets computed backwards-in-time from a region around the target.

3. The controller of claim 1, wherein the RCS vary at multiple instances across the trajectory horizon (t) and the safety horizon (τ).

4. The controller of claim 3, wherein the variation of the RCS defines a keep-away zone for the vehicle to avoid in case of a partial or full thrust control failure of the vehicle.

5. The controller of claim 1, wherein the isoperimetric reformulation transforms constraints based on the RCS into a boundary value problem.

6. The controller of claim 1, wherein the double integral over the trajectory horizon and the safety horizon includes a numerical integration of a dynamical system differential equation over the trajectory horizon with an integration over the safety horizon.

7. The controller of claim 6, wherein the integration over the safety horizon is composed with a quadratic programming (QP) solver for computing the distance between the vehicle and the keep-away zone.

8. The controller of claim 1, wherein the boundary value problem is formed by augmenting a dynamical state of the vehicle with an auxiliary state, and wherein the auxiliary state is an integral of the isoperimetric reformulation of the constraints based on a nonlinear scalar-valued metric of the RCS.

9. The controller of claim 8, wherein the nonlinear scalar-valued metric of the RCS is a signed distance of a state of the vehicle to the RCS.

10. The controller of claim 1, wherein the processor is further configured to solve the boundary value problem with sequential convex programming (SCP) with iterative convexification of the RCS.

11. The controller of claim 10, wherein, for a current iteration of the SCP, the processor is configured to:

accept the current trajectory iterate determined by a previous iteration of the SCP; and recompute the RCS for linearized dynamics of the vehicle corresponding to the current trajectory iterate.

12. The controller of claim 10, wherein RCS approximated at each iteration of the SCP is inflated using Lagrange remainder to satisfy the constraints based on the RCS within a tube around the trajectory.

13. The controller of claim 1, wherein the vehicle is a spacecraft, and wherein the processor is further configured to control the spacecraft according to the trajectory while ensuring passive safety of the spacecraft.

14. The controller of claim 1, wherein the vehicle is a lander, and wherein the processor is further configured to control a landing operation of the lander according to the trajectory while ensuring passive safety of the lander.

15. The controller of claim 1, wherein the vehicle is a marine vehicle, and wherein the processor is further configured to control an operation of the marine vehicle according to the trajectory while ensuring passive safety of the marine vehicle.

16. The controller of claim 1, wherein the vehicle is a ground vehicle, and wherein the processor is further configured to control the ground vehicle according to the trajectory without colliding with obstacles of the ground vehicle.

17. A method for controlling an operation of a vehicle subject to constraints based on continuously parametrized sets (CPS), comprising:

determining a trajectory for the vehicle using an isoperimetric reformulation of the constraints based on the CPS, wherein the trajectory is iteratively updated with successive approximations of the CPS using linearized dynamics of the vehicle corresponding to a current trajectory iterate, wherein the CPS are robust controllability sets (RCS) that are continuously parametrized by propagation time for trajectory horizon (t) and safety horizon (τ), and wherein the isoperimetric reformulation presents constraints based on the RCS as a double integral over the trajectory horizon and the safety horizon of a distance between the vehicle and a keep-away zone and reformulates the double integral as a boundary value problem over the trajectory horizon; and controlling the vehicle according to the trajectory.

18. A non-transitory computer-readable storage medium embodied thereon a program executable by a processor for performing a method for controlling an operation of a vehicle subject to constraints based on continuously parametrized sets (CPS), the method comprising:

determining a trajectory for the vehicle using an isoperimetric reformulation of the constraints based on the CPS, wherein the trajectory is iteratively updated with successive approximations of the CPS using linearized dynamics of the vehicle corresponding to a current trajectory iterate, wherein the CPS are robust controllability sets (RCS) that are continuously parametrized by propagation time for trajectory horizon (t) and safety horizon (τ), and wherein the isoperimetric reformulation presents constraints based on the RCS as a double integral over the trajectory horizon and the safety horizon of a distance between the vehicle and a keep-away zone and reformulates the double integral as a boundary value problem over the trajectory horizon; and controlling the vehicle according to the trajectory.

* * * * *